(12) United States Patent
Durkee et al.

(10) Patent No.: US 10,769,587 B2
(45) Date of Patent: Sep. 8, 2020

(54) SYSTEMS AND METHODS OF STORING AND RETRIEVING RETAIL STORE PRODUCT INVENTORY

(71) Applicant: Walmart Apollo, LLC, Bentonville, AR (US)

(72) Inventors: Paul E. Durkee, Centerton, AR (US); Brian C. Roth, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/435,735

(22) Filed: Jun. 10, 2019

(65) Prior Publication Data

US 2020/0005229 A1 Jan. 2, 2020

Related U.S. Application Data

(60) Provisional application No. 62/693,161, filed on Jul. 2, 2018.

(51) Int. Cl.
*G06Q 10/08* (2012.01)
*B65G 1/06* (2006.01)
(Continued)

(52) U.S. Cl.
CPC ......... *G06Q 10/087* (2013.01); *B64C 39/024* (2013.01); *B65G 1/0492* (2013.01);
(Continued)

(58) Field of Classification Search
CPC ............................... G06Q 10/087; B65G 1/06
(Continued)

(56) References Cited

U.S. PATENT DOCUMENTS 7,101,139 B1   9/2006  Benedict
7,591,630 B2 * 9/2009  Lert, Jr. ............... B65G 1/0492
                                                        414/807
(Continued)

FOREIGN PATENT DOCUMENTS

WO      2016014917      1/2016

OTHER PUBLICATIONS

Patterson, Robbie; "Australian made robot designed to keep shelves fully stocked set to revolutionise the retail industry"; https://www.dailytelegraph.com.au/newslocal/manly-daily/australian-made-robot-designed-to-keep-shelves-fully-stocked-set-to-revolutionise-the-retail-industry/news-story/ff69b51e94e2e196e578085e41e306c0; Jan. 17, 2017; pp. 1-6.

(Continued)

*Primary Examiner* — Oluseye Iwarere
(74) *Attorney, Agent, or Firm* — Fitch, Even, Tabin & Flannery LLP

(57) ABSTRACT

Apparatuses and methods are provided herein useful in retail store inventory storage and retrieval. Some embodiments provide systems, comprising: a rack system positioned above a dropdown ceiling and extending over the sales floor, and comprising: a plurality of racks, a rail system and the plurality of access passages; a plurality of unmanned vehicles; a plurality of access stations, wherein the access stations physically cooperate with one of the access passages; each rack comprises storage cells to receive a reusable tote; and wherein the central control circuit is configured to receive a request for a first product, identify a first access station, access the inventory tracking system to identify a first storage cell in which the first product is stored, identify an available unmanned vehicle, and communicate to the unmanned vehicle directing the unmanned (Continued)

vehicle to retrieve the tote and transport the tote to the first access station.

20 Claims, 11 Drawing Sheets

(51) Int. Cl.
    *B65G 1/04*     (2006.01)
    *B64C 39/02*     (2006.01)
    *B65G 1/137*     (2006.01)
(52) U.S. Cl.
    CPC .............. *B65G 1/06* (2013.01); *B65G 1/1378* (2013.01); *B64C 2201/128* (2013.01)
(58) Field of Classification Search
    USPC ............................. 705/28; 414/273; 700/216
    See application file for complete search history.

(56) References Cited

U.S. PATENT DOCUMENTS

| | | | |
|---|---|---|---|
| 7,991,505 B2* | 8/2011 | Lert, Jr. ............... | B65G 1/0492 198/347.1 |
| 9,758,301 B2 | 9/2017 | Porat | |
| 9,953,287 B1 | 4/2018 | McDonald, Jr. | |
| 10,233,019 B2* | 3/2019 | Lert ...................... | B65G 1/1378 |
| 10,336,543 B1* | 7/2019 | Sills ...................... | G05D 1/0027 |
| 2004/0249497 A1* | 12/2004 | Saigh ...................... | E04H 14/00 700/216 |
| 2005/0047895 A1* | 3/2005 | Lert, Jr. ............... | B65G 1/0492 414/273 |
| 2009/0074545 A1* | 3/2009 | Lert, Jr. ............... | B65G 1/0492 414/276 |
| 2011/0313811 A1* | 12/2011 | Urban .................. | B60P 3/0257 705/7.25 |
| 2012/0101627 A1* | 4/2012 | Lert ...................... | B65G 1/1378 700/216 |
| 2012/0197431 A1 | 8/2012 | Toebes | |
| 2014/0032034 A1 | 1/2014 | Raptopoulos | |
| 2014/0277692 A1 | 9/2014 | Buzan | |
| 2014/0288696 A1 | 9/2014 | Lert | |
| 2016/0075512 A1 | 3/2016 | Lert, Jr. | |
| 2016/0110701 A1 | 4/2016 | Herring | |
| 2016/0207710 A1 | 7/2016 | Conrad | |
| 2016/0280460 A1 | 9/2016 | Porat | |
| 2016/0347544 A1 | 12/2016 | Kvifte | |
| 2016/0355337 A1 | 12/2016 | Lert | |
| 2017/0010608 A1 | 1/2017 | High | |
| 2017/0076354 A1 | 3/2017 | High | |
| 2017/0137222 A1 | 5/2017 | Lert, Jr. | |
| 2017/0137223 A1 | 5/2017 | Lert, Jr. | |
| 2017/0166356 A1 | 6/2017 | Tubilla Kuri | |
| 2017/0247187 A1* | 8/2017 | Lert ...................... | B65G 1/1378 |
| 2017/0313514 A1* | 11/2017 | Lert, Jr. ............... | B65G 1/065 |
| 2017/0369243 A1 | 12/2017 | Lert, Jr. | |
| 2018/0134492 A1 | 5/2018 | Lert, Jr. | |
| 2018/0150793 A1 | 5/2018 | Lert, Jr. | |
| 2018/0189015 A1* | 7/2018 | Mattingly ............... | G06F 16/26 |
| 2018/0189694 A1* | 7/2018 | Mattingly ........... | G06Q 10/0631 |
| 2018/0194556 A1* | 7/2018 | Lert, Jr. ............... | B65G 1/1378 |
| 2018/0341908 A1* | 11/2018 | Lert, Jr. ............... | G06Q 10/087 |
| 2019/0009985 A1* | 1/2019 | Lert, Jr. ............... | B65G 1/0492 |
| 2019/0210804 A1* | 7/2019 | Lert ...................... | B65G 1/0492 |

OTHER PUBLICATIONS

Pinc; "Warehouse Drones: Real-Time Inventory Tracking by Air"; https://www.pinc.com/warehouse-drone-inventory-management; available at least as early as May 23, 2018; pp. 1-10.

Schofield, Jay; "What Do Drones Mean for the Future of Warehouses?"; http://www.systemid.com/learn/what-do-drones-mean-for-the-future-of-warehouses/; Jul. 5, 2016; pp. 1-4.

Tech in Asia; "Drone-delivered Crocs in Tokyo: Drone delivers"; published on Mar. 5, 2015; https://www.youtube.com/watch?v=JwQhFX5uSrA; pp. 1-4.

PCT; App. No. PCT/US2019/039196; International Search Report and Written Opinion dated Sep. 20, 2019.

* cited by examiner

SYSTEMS AND METHODS OF STORING AND RETRIEVING RETAIL STORE PRODUCT INVENTORY

CROSS-REFERENCE TO RELATED APPLICATION

This application claims the benefit of U.S. Provisional Application No. 62/693,161, filed Jul. 2, 2018, which is incorporated herein by reference in its entirety.

TECHNICAL FIELD

This invention relates generally to retail inventory storage and retrieval.

BACKGROUND

Storage of inventory at a retail store can significantly affect the efficiency of the retail store. Often inventory is stored in what is commonly referred to as a back storage area. This back storage area can be a significant size and thus take up a valuable amount of the floor space of a retail store.

BRIEF DESCRIPTION OF THE DRAWINGS

Disclosed herein are embodiments of systems, apparatuses and methods pertaining to the storage of retail products in typically unused retail space and retrieval of those products with unmanned vehicles. This description includes drawings, wherein.

Figure 1:
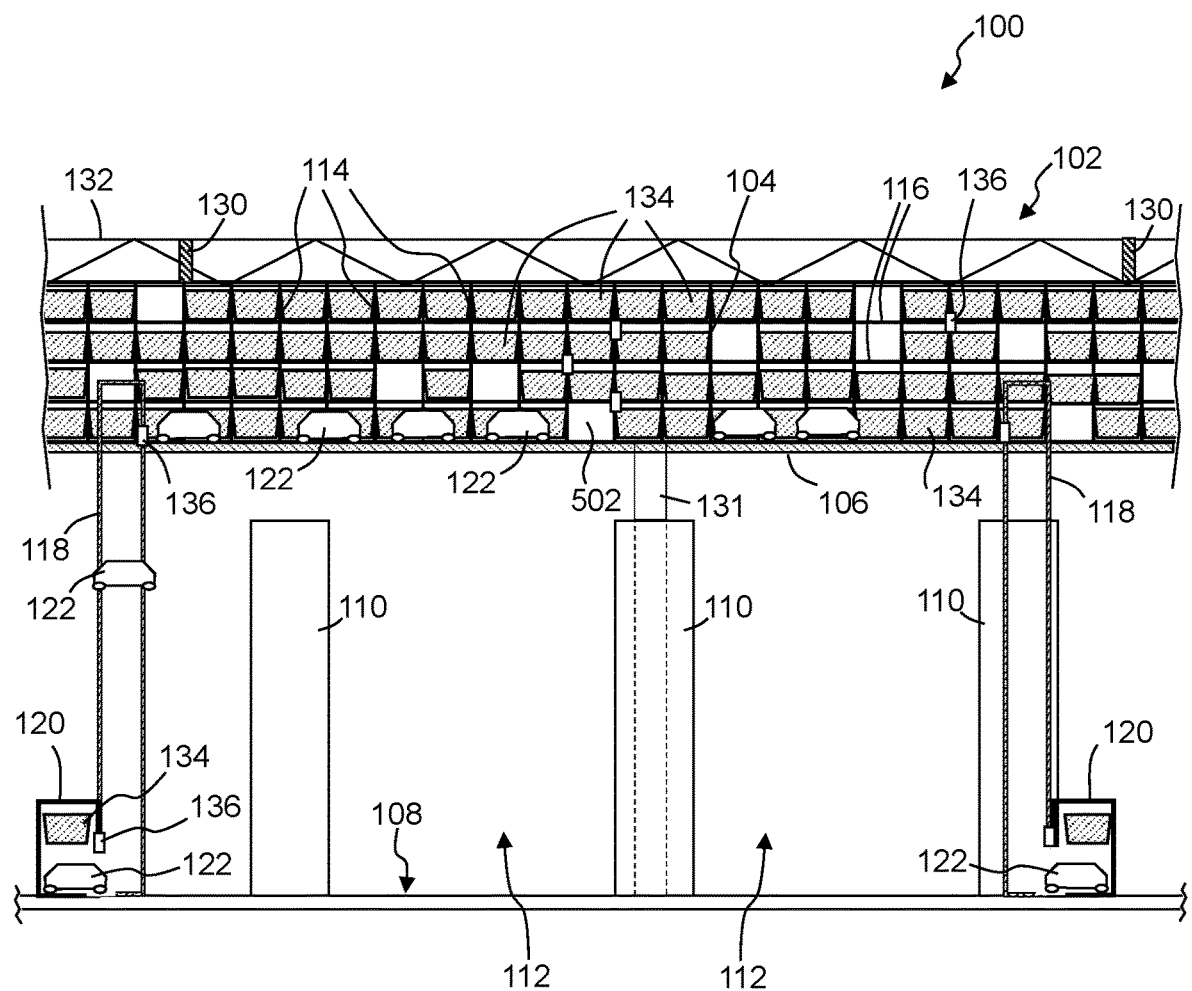
FIG. 1 illustrates a simplified cross-sectional view of an exemplary portion of an exemplary retail store, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to store retail products in typically unused retail space of a retail store and retrieval of those products with unmanned vehicles. In some embodiments, a retail store inventory storage and retrieval system is provided at a retail store that includes a rack system that is positioned above a dropdown ceiling of the retail store and extending over at least a majority of a sales floor comprising product support devices supporting products offered for sale and separated by aisles along which customers move in order to locate and select desired products for purchase from the retail store. In some implementations, the rack system comprises: a plurality of racks, a rail system and the plurality of access passages. Further, the system includes a retail store inventory central control circuit, an inventory tracking system communicatively coupled with the central control circuit, a plurality of unmanned vehicles in wireless communication with the central control circuit, and a plurality of access stations each positioned at various different locations throughout the sales floor and an exterior of the retail store, wherein each of the access stations is physically cooperated with at least one of the plurality of access passages of the rack system. In some implementations, the system includes a plurality of sensor systems communicatively coupled with at least the central control circuit and configured to detect at least totes as they are moved through the rack system. Typically, each of the unmanned vehicles comprises a vehicle control circuit, at least one motor controlled by the vehicle control circuit, a propulsion system operatively coupled with the at least one motor and configured to induce movement of the unmanned vehicle in response to being driven by the motor, and a tote retrieval system. Some or all of the plurality of racks, in some embodiments, are organized in a plurality of rows with each row having a plurality of aligned racks, wherein each rack comprises a plurality of storage cells configured to receive a reusable storage tote that is configured to receive and maintain at least one product of the hundreds of thousands of products offered for sale by the retail store. The rail system can be configured to include a grid of a plurality of rails, typically in pairs of rails, that are cooperated and extending at least vertically and horizontally between rows of racks of the plurality of racks and the storage cells of racks. The access passages cooperate the plurality of racks with at least one of the access stations and comprise some of the rail system enabling the unmanned vehicles to transport the totes between the racks and the access stations. The central control circuit, in some embodiments, is configured to receive a request for a particular product, identify a relevant access station of the plurality of access stations to which the particular product is to be routed, access the inventory tracking system to identify a first storage cell in which the particular product is stored within a first tote, identify an available first unmanned vehicle of the plurality of unmanned vehicles, and communicate to the first unmanned vehicle directing the first unmanned vehicle to retrieve the first tote and transport the first tote to the first access station.

Some embodiments provides methods of storing and retrieving products at a retail store where a retail store inventory central control circuit receives a request for a first product of hundreds of thousands of products stored and available for sale at a retail store; An inventory tracking system of the retail store is accessed to obtain a storage cell location identifier from the inventory tracking system for a first storage cell within a rack system of the retail store positioned above a dropdown ceiling of the retail store and extending over at least a majority of a sales floor comprising product support devices supporting the products offered for sale and separated by aisles along which customers move in order to locate and select desired products for purchase from the retail store. In some embodiments, the rack system comprises: a plurality of racks, a rail system and a plurality of access passages. The plurality of racks are organized in a plurality of rows with each row having a plurality of aligned racks, wherein each rack comprises a plurality of storage cells, including the first storage cell, with each of the plurality of storage cells being configured to receive a reusable storage tote that is configured to receive and maintain at least one product of the hundreds of thousands of products offered for sale by the retail store; and wherein the rail system comprises a grid of a plurality of pairs of rails that are cooperated and extending at least vertically and horizontally between rows of racks of the plurality of racks and the storage cells of racks. The method can further include: identifying an available first unmanned vehicle of a plurality of unmanned vehicles; directing the first unmanned vehicle to the first storage cell, wherein each of the unmanned vehicles comprises a vehicle control circuit, at least one motor controlled by the vehicle control circuit, a propulsion system operatively coupled with the at least one motor and configured to induce movement of the unmanned vehicle in response to being driven by the motor, and a tote retrieval system; receiving a confirmation that the first unmanned vehicle retrieved the first tote; identifying and directing the first unmanned vehicle to a first access station of a plurality of access stations to which the first product is to be routed, wherein each of the access stations is positioned at one of various different locations throughout the sales floor and an exterior of the retail store, wherein each of the access stations is physically cooperated with one of the plurality of access passages of the rack system, and causing the first unmanned vehicle to transport the first tote to a first access passage of the plurality of access passages that physically corresponds to the first access station, wherein each of the access passages cooperates the plurality of racks with at least one of the plurality of access stations and comprises some of the rail system enabling the unmanned vehicles to transport the totes between the racks and the corresponding access stations; receiving sensor data from one or more sensor systems of a plurality of sensor systems communicatively coupled with at least the central control circuit and configured to detect at least totes as they are moved through the rack system, and confirm a retrieval and transport of the first tote; and directing the first unmanned vehicle to utilize the first access passage and transport the first tote to the first access station.

FIG. 1 illustrates a simplified cross-sectional view of an exemplary portion of an exemplary retail store 100, in accordance with some embodiments. The retail store 100 includes a retail store inventory storage and retrieval system 102 that includes one or more rack systems 104 that are positioned in one or more areas of the retail store, and including in areas of the retail store that are typically not utilized and/or underutilized. In some embodiments, the rack system 104 is positioned above a dropdown ceiling 106 of the retail store and extending over at least a majority of a sales floor 108 of the retail store. The sales floor has numerous product support devices 110 (e.g., shelves, racks, bins, refrigerated units, etc.) that support products offered for sale at the retail store. In some embodiments, the product support devices 110 are arranged on the sales floor and separated to define aisles 112 along which customers move, push carts and the like in order to locate and select desired products positioned on the product support devices 110 for purchase from the retail store.

Figure 2:
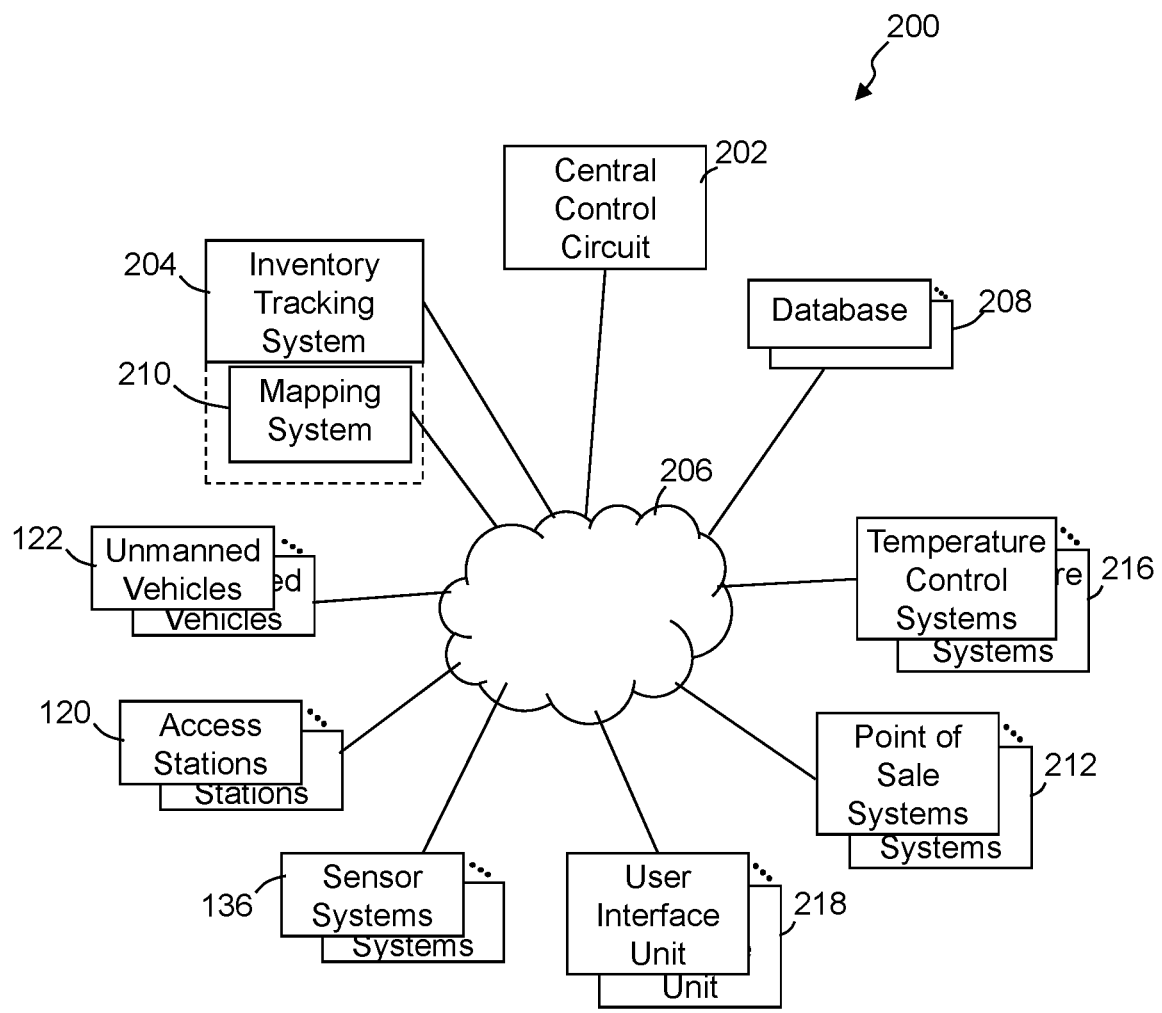
FIG. 2 illustrates a simplified block diagram of an exemplary control system of the inventory storage and retrieval system, in accordance with some embodiments.

FIG. 2 illustrates a simplified block diagram of an exemplary control system 200 of the inventory storage and retrieval system 102, in accordance with some embodiments. The control system of the inventory storage and retrieval system 102 includes one or more retail store inventory central control circuits 202 and an inventory tracking system 204 that are communicatively coupled through one or more wired and/or wireless communication and/or computer networks 206 (e.g., WAN, LAN, Internet, cellular, etc.). The control system further includes or communicatively couples with the unmanned vehicles 122 where the central control circuit 202 can provide instructions, routing and other such control information to the unmanned vehicles and receive information from the unmanned vehicles. Additionally, the central control circuit communicatively couples with the access stations 120, the sensor systems 136 and point of sale systems 212. The point of sale systems enable customers to purchase products from the retail store and can be operated by workers at the retail store, self-service operated by customers, and/or accessed via one or more portable user interface units 218 of the customers, the store or the workers (e.g., through a web interface, mobile application (APP), or the like). Some embodiments include one or more temperature control systems 216 on the sales floor and/or associated with the rack system that enable the control of temperature within certain zones or volumes of the retail store. The inventory tracking system 204 typically receives sensor data from one or more sensor systems 136 and the unmanned vehicles, as well as product delivery information, product order information, sales information from the point of sale systems 212 and other such information. Based on this information, the inventory tracking system can maintain one or more databases 208 of inventory information. Such information can include but is not limited to product quantities, product sales rates, product locations, and other such information. Some embodiments include a product mapping system 210 that is communicatively coupled with the inventory tracking system 204 and/or central control circuit 202, and/or may be part of the inventory tracking system. The mapping system utilizes product location information and predefine mapping of the store layout (e.g., location of shelves, bins, point of sale systems, product organization, etc.) and a predefined mapping of the rack system (rack locations, storage cell locations, access passage locations, access station locations, etc.).

Figure 3:
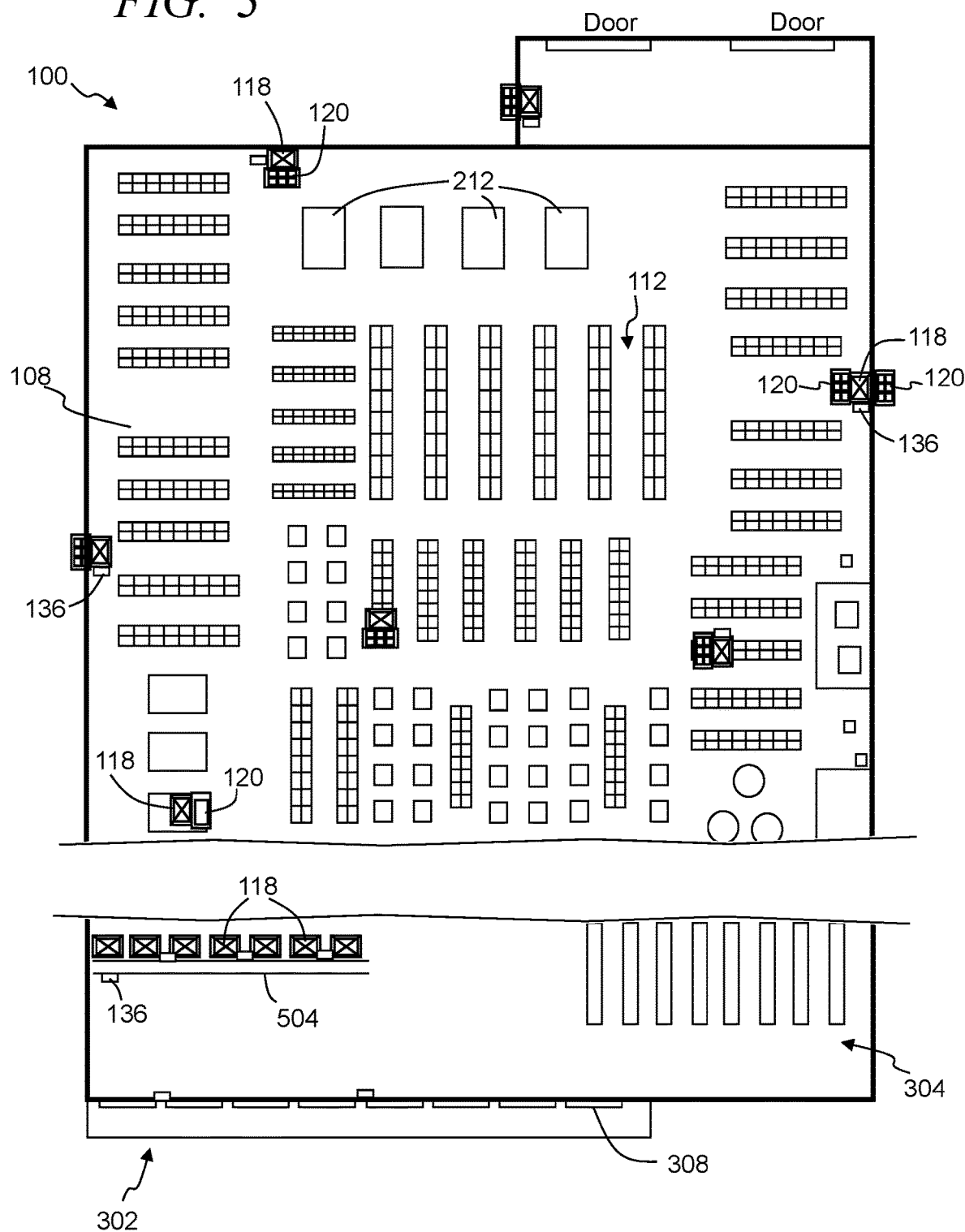
FIG. 3 illustrates a simplified block diagram of an overhead plan view of a portion of an exemplary sales floor, exemplary loading dock or area, and back storage area of the retail store, in accordance with some embodiments.

FIG. 3 illustrates a simplified block diagram of an overhead plan view of a portion of an exemplary sales floor 108, exemplary loading dock 302 or area, and back storage area 304 of the retail store 100, in accordance with some embodiments. Referring to FIGS. 1-3, the rack system 104 includes a plurality of racks 114 with a rail system 116 and/or other transport supports extending through the rack system 104, a plurality of access passages 118, and multiple access stations 120 that cooperate with one or more of the access passages 118. The rack system distributed through the retail store and typically in areas that previously were unused and/or underutilized. For example, the rack system can be positioned above a dropdown ceiling 106 and supported by suspensions, columns other such support structures, or a combination of such support structures. Some or all of the racks may be suspended by a plurality of suspension beams 130 extending from a ceiling support 132 (e.g., joists, roof beams, girders, girts, struts, ties, trusses, rafters, and the like) of the retail store and secured with the rack system such that the rack system is suspended from the ceiling support or other structural support of the building, and/or supported by one or more support columns 131 distributed throughout the sales floor and/or other areas of the retail store, and extending from the sales floor through the dropdown ceiling and supporting some or all of the rack system. Some or all of the columns may be positioned to extend through one or more product support devices 110.

Figure 4:
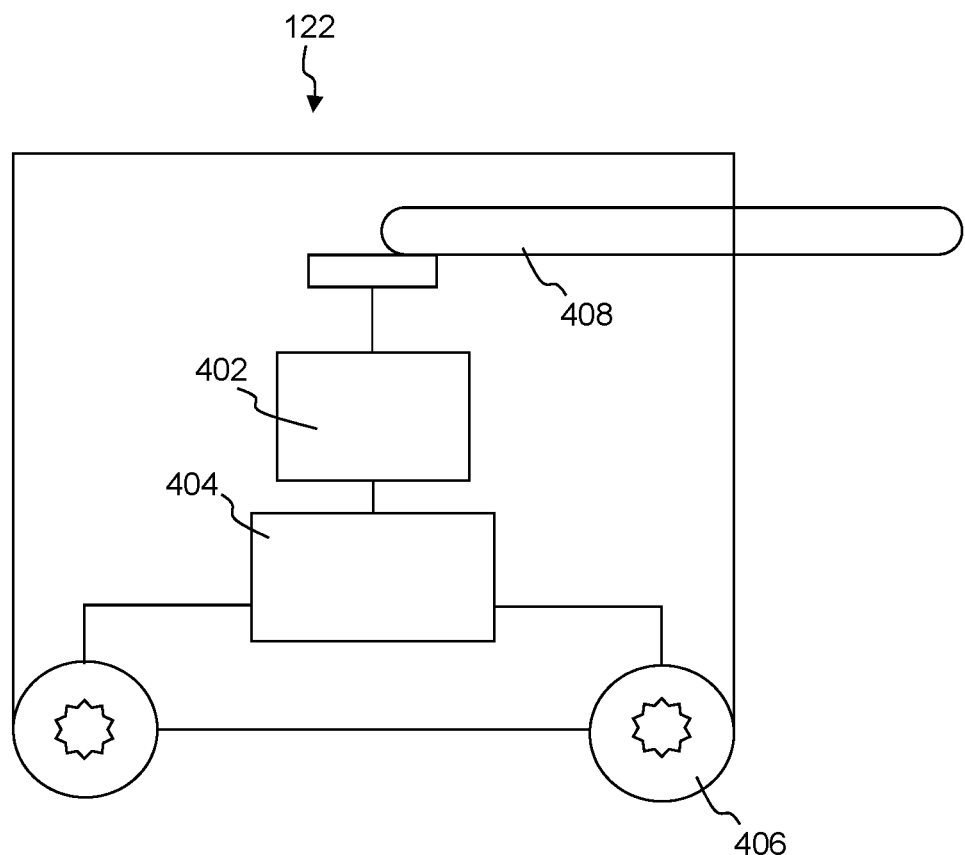
FIG. 4 illustrates a simplified block diagram of an exemplary unmanned vehicle, in accordance with some embodiments.

Additionally or alternatively, the rack system 104, although not illustrated, can be positioned above some or all of the loading dock 302, above some or all of the back storage area 304, in the back storage area, an area specifically configured for the racking system, and/or other areas of the retail store or a separate and storage structure or building exterior to and adjacent the retail store. The inventory storage and retrieval system 102 further includes a plurality of unmanned vehicles 122 that are in wireless communication with the central control circuit(s) 202. FIG. 4 illustrates a simplified block diagram of an exemplary unmanned vehicle 122, in accordance with some embodiments. Each of the unmanned vehicles 122 includes at least a vehicle control circuit 402, at least one motor 404 controlled by the vehicle control circuit, and a propulsion system 406 (e.g., one or more wheels, gears, gear wheels, treads, other such propulsion systems or combination of two or more of such systems) that are operatively coupled with at least one motor 404 and configured to induce movement of the unmanned vehicle in response to being driven by the motor. The unmanned vehicle further includes a tote retrieval system 408, product retrieval system and/or other such system to retrieve totes 134 or products from the racks 114 of the rack system 104. For example, the tote retrieval system 408 may include one or more motors, arms, pivots, hinges, grippers, lift-bars, stabilizers, other such mechanisms, or a combination of mechanism. In some instances, for example, a tote retrieval system includes one or more motors that cooperate with tote bars that extend and retract to engage lift handles, recess or protrusions on the totes. The unmanned vehicle typically includes multiple vehicle sensor systems 410 such as one or more of but not limited to location detection systems (e.g., GPS, bar code readers, RFID tag readers, etc.), inertial sensors, accelerometers, velocity sensors, distance sensors, cameras, image processing, image recognition systems, RFID tag readers, bar code readers, weight sensors, other such sensors, and typically a combination of two or more of such vehicle sensor systems. Additionally or alternatively, the rack system can extend to back storage areas, below floor and/or ground level areas and other areas of a retail store. Often such areas are not utilized or underutilized because there was insufficient accessibility to such areas, inefficient access, and the like. The cooperative use of the rack system and unmanned vehicles provides a solution to effectively utilize such unused or previously underutilized areas of the retail store.

In some embodiments, the storage and retrieval system 102 includes plurality of sensor systems 136 cooperated with the racks 114, unmanned vehicles 122, access stations 120, totes, unmanned vehicles and/or other locations of the storage and retrieval system and retail store. The sensor systems are communicatively coupled with at least the central control circuit 202 and configured to detect unmanned vehicles and/or totes as they are moved through the rack system. The sensor systems can include but are not limited to one or more of RFID tags and RFID reader systems, bar code reader systems, imaging systems and image processing systems for image recognition, motion and/or inertial sensor systems, communication triangulation systems, global positioning (e.g., GPS) systems, distance measurement systems, other such systems, or a combination of two or more of such sensor systems. In some implementations, for example, one or more RFID tag reader systems may be positioned relative to one or more storage cells 502 to detect one or more RFID tags associated with a tote placed or removed from the one or more storage cells and/or to detect one or more RFID tags of one or more products within a tote. Similarly, one or more RFID tag reader systems and/or bar code reader systems can be positioned adjacent to and/or along an access passage 118 to detect movement of one or more totes and/or products through the access passage. Similarly, an image processing system may be positioned relative to an access station to capture an image of one or more products and/or customer at an access station. In some instances, an RFID tag reader system and/or bar code reader system may be positioned within, on or adjacent an access station to detect products placed into or removed from the access station. Similarly, one or more sensor systems may be positioned relative to one or more rail pairs and/or storage cells to detect unique identifiers of unmanned vehicles 122 as they move through the rack system and/or the retail store. Sensor data is communicated to the central control circuit 202 and/or the inventory tracking system 204, and utilized by the central control circuit and/or the inventory tracking system to track movement of unmanned vehicles, totes, products, workers, customers and the like, and/or track the movement of products.

Figure 5:
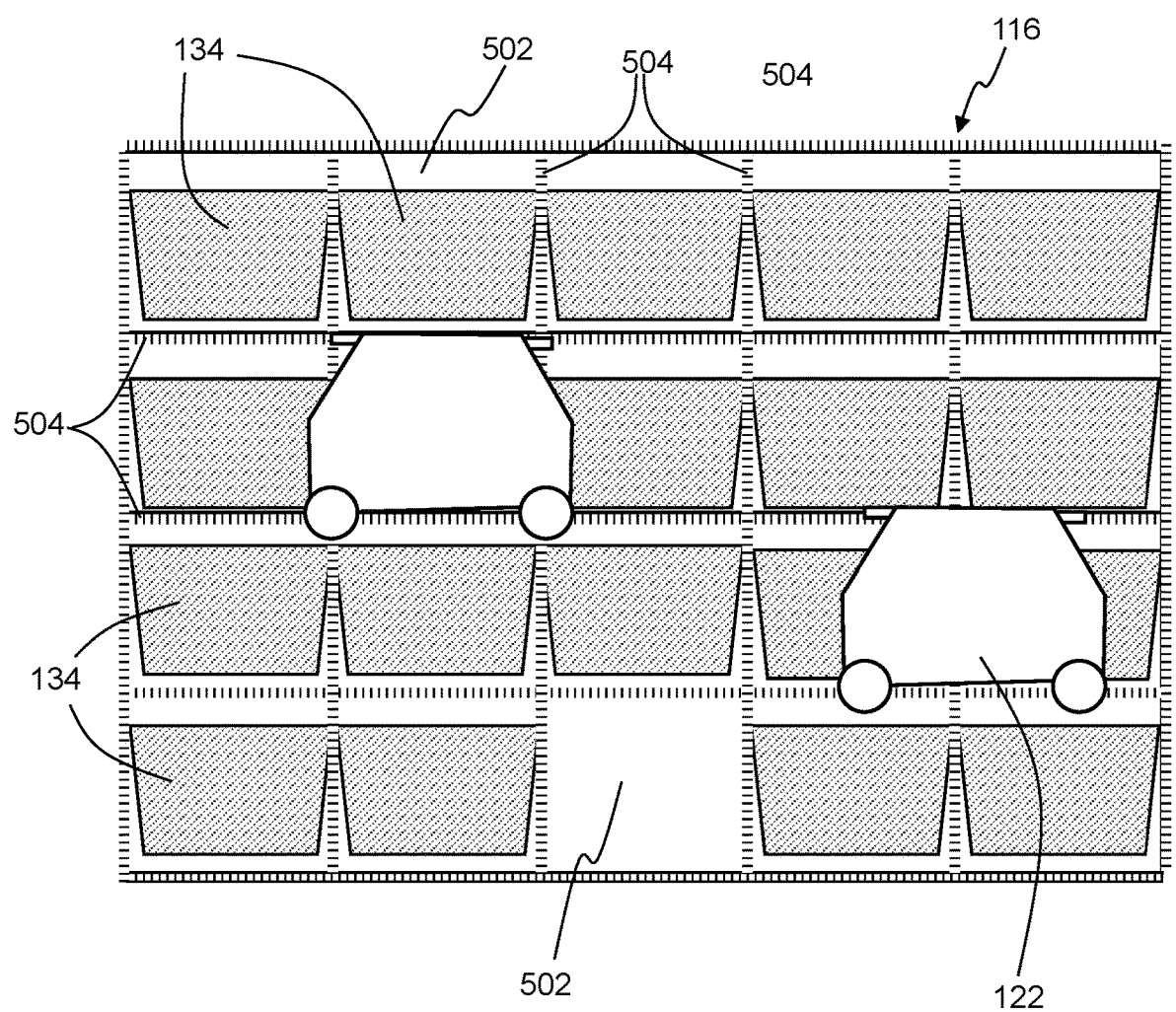
FIG. 5, illustrates a simplified block diagram of exemplary racks cooperated into rows and columns, in accordance with some embodiments.

In some embodiments, the plurality of racks 114 of the rack system 104 are organized in a plurality of rows and/or columns with each row and/or column having a plurality of aligned racks. FIG. 5, illustrates a simplified block diagram of exemplary racks 114 cooperated into rows and columns, in accordance with some embodiments. Referring to FIGS. 1-5, each rack 114 includes at least one and typically a plurality of storage cells 502. In some embodiments, the storage cells 502 are configured to receive one or more reusable storage totes 134. Such totes are configured to receive and maintain at least one product of the hundreds of thousands of products offered for sale by the retail store. In some instances, a single tote may store multiple different products. Further, some totes may be implemented to include multiple separate compartments that are each configured to receive one or more products. Again, the rack system 104 includes a rail system 116 that enables the unmanned vehicles to move through and/or along the rack system to access the storage cells 502. In some embodiments, the rail system 116 comprises a grid of a plurality of pairs of rails 504 that are cooperated and extending at least vertically and horizontally between rows and/or columns of racks 114 of the plurality of racks and the storage cells 502 of racks. The rails are configured to enable the unmanned vehicles 122 to traverse the rack system 104 to access at least a subset of the storage cells, and typically any one of the storage cells of the rack system. In some embodiments, the unmanned vehicles utilize at least two rails at any given time, and in many instances four rails. Some of the rails may include teeth to engage one or more gear wheels of the unmanned vehicles. Additionally or alternatively, one or more of the rails may include a retaining ledge, lip, or the like that prevents a wheel of the unmanned vehicle from separating from the rail. One or more gaps or openings may be included in the retaining ledge to enable the unmanned vehicle to transition between rails and/or to exit the rail system (e.g., when autonomously moving out onto the sales floor or other area of the retail store where there are not rails). In some embodiments, the racks 114, rack system 104, rail system 116 and/or access passages may be implemented utilizing systems describe in U.S. Application Publication Nos.: 2012/0197431 by Toebes et al, filed Aug. 2, 2012; 2014/0277692 by Buzan et al., filed Jul. 17, 2014; 2014/0288696 by Lert, filed Mar. 14, 2014; 2016/0075512 by Lert, filed Sep. 21, 2015; 2016/0355337 by Lert et al., filed Jun. 2, 2016; 2016/0207710 by Conrad et al, filed Jan. 18, 2016; 2017/0137223 by Lert, filed Jan. 31, 2017; 2017/0137222 by Lert, filed Jan. 31, 2017; 2017/0313514 by Lert et al., filed May 10, 2017; 2017/0369243 by Lert, filed Sep. 8, 2017; 2018/0134492 by Lert, filed Nov. 17, 2017; and 2018/0150793 by Lert et al., filed Nov. 29, 2017, which are incorporated in their entirety herein by references. Additionally or alternatively, the rack system and/or access passages may include and/or be cooperated with a track system such as a track system and chutes described in U.S. Application Publication No. 2017/0010608 by High et al., filed Jan. 12, 2017, which is incorporated in its entirety herein by reference.

The plurality of access stations 120 are each positioned at various different locations throughout the sales floor and an exterior of the retail store. FIG. 3 illustrates some of the access stations being positioned inside the retail store while some of the access stations are positioned exterior to the retail store. Each of the access stations 120 is physically cooperated with at least one of the plurality of access passages 118 of the rack system with the corresponding access passage 118 providing a route or path that the unmanned vehicles 122 can travel to transport products and/or totes between the rack system above the dropdown ceiling or other location of the retail store and the access stations 120 that are accessible by customers and workers of the retail store (e.g., on the sales floor, proximate the loading dock, at a drive-up location in the parking lot, etc.). Typically, the access stations 120 are strategically positioned at the retail store to provide convenient access by customers and workers to the access stations. Each of the access passages 118 cooperates at least a subset of the racks of the rack system with at least one of the access stations 120. Further, in some implementations access stations can be positioned in general areas of the retail store to simplify and/or speed the retrieval and movement of requested products from storage cells to an access station. In some embodiments, the access passages include some of the rail system enabling the unmanned vehicles 122 to transport product and/or the totes 134 between the racks and the access stations. For example, a one or more pairs of rails may extend along the length of the access passage and into the access station to enable the unmanned vehicle to autonomously position itself into an appropriate orientation and alignment with an opening and/or door of a specified access station.

Figure 6:
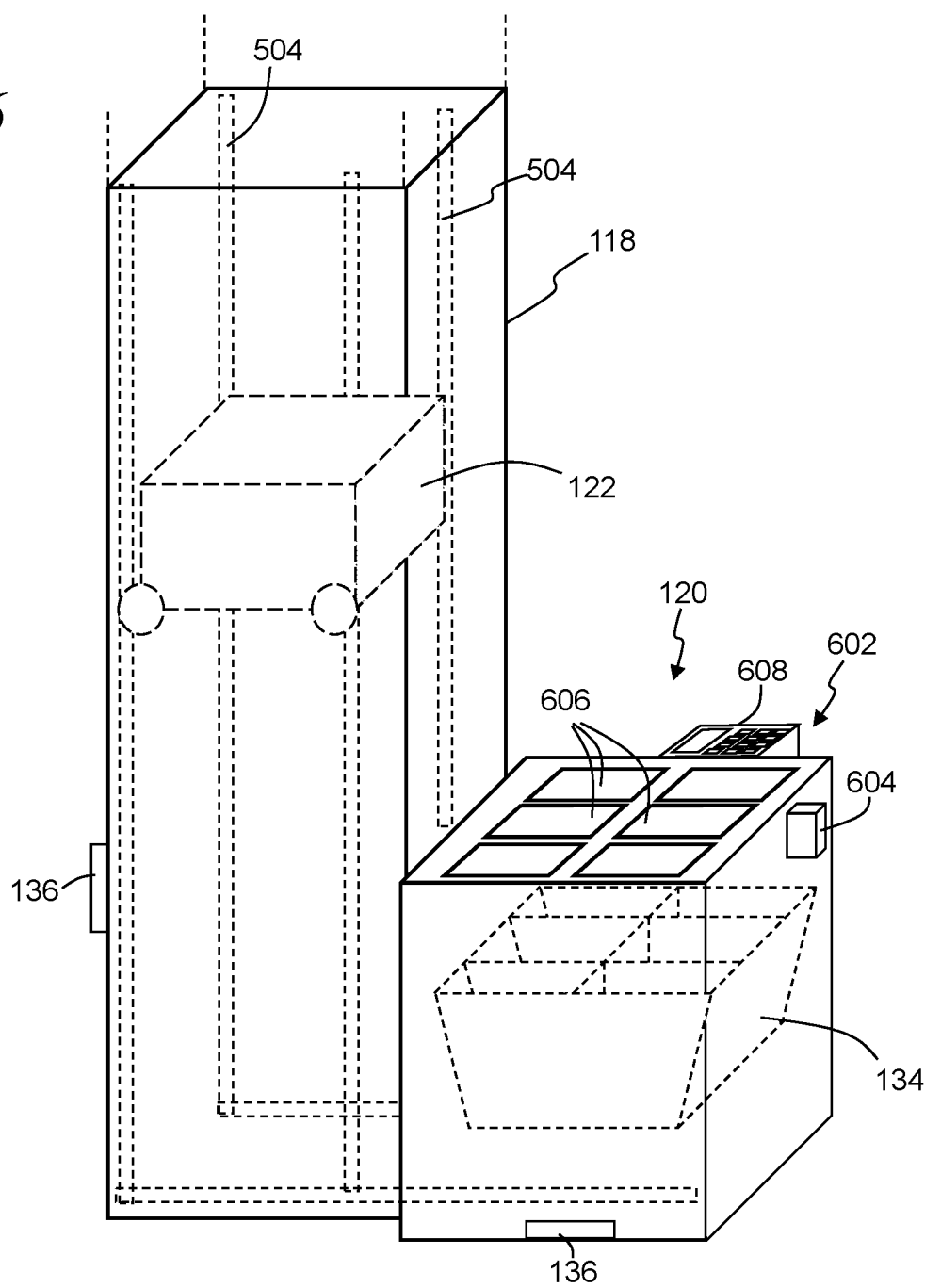
FIG. 6 shows a simplified block diagram of an exemplary access station cooperated with an access passage, in accordance with some embodiments.
Figure 7:
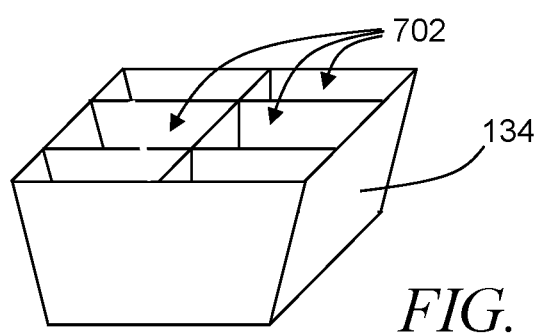
FIG. 7 illustrates simplified block diagram of an exemplary tote, in accordance with some embodiments.

FIG. 6 shows a simplified block diagram of an exemplary access station 120 cooperated with an access passage 118, in accordance with some embodiments. As described above, in some embodiments the access passage includes one or more rails 504 extending along the access passage 118 to be utilized by one or more unmanned vehicles in moving to or from the access station. In some embodiments, the access station includes one or more doors 606 or the like that limits access to the interior of the access station and/or to limit access within the access station. The unmanned vehicle can transport one or more totes 134 to or from the access station. As described above, in some embodiments, some of the totes 134 may be configured with multiple compartments. FIG. 7 illustrates simplified block diagram of an exemplary tote 134, in accordance with some embodiments. In this example, the tote 134 includes multiple compartments 702 each configured to receive one or more products. The multiple compartments allow products to be organized, restrict interaction and/or contact between products, increase storage capacity, and/or restrict access to products within a single tote. The access station may be configured to take advantage of the multiple compartments 702 and limit access to one or more of the compartments depending on product(s) being provided to and/or retrieved from the access station. Referring to FIG. 6, in some embodiments, some or all of the access station 120 include an access system 602 comprising an access system controller 604 and at least one access door 606. The door may be locked in some states (e.g., while an unmanned vehicle is moving a tote or product into or out of an access station, when not in use, etc.), and unlocked in some states. Further, in some embodiments, one or more doors may be positioned to enable access to all or just some of the tote. In some embodiments, the door may include one or more sliding members that can be slide relative to each other to expose one or more compartments and/or blocking one or more compartments. In some implementations, one or more doors are movably positioned to prevent access to and/or allow access to at least a portion of a product retrieval opening within the access station that is configured to align with a tote when the tote is placed within the access station. The access system controller 604 can be configured to obtain a mapping of the compartments of a multiple compartment tote. This mapping may be predefined and locally stored at the access station, while in other instances may be received from the central control circuit 202, accessed from a database or the like. For example, a tote mapping may be communicated to the access station controller from the central control circuit based on instructions communicated to an unmanned vehicle to transport a tote to that access station. The mapping may provide identifiers for different compartments, dimensions of compartments, product identifiers within one or more of the compartments, or the like. In some embodiments, the access system controller 604 obtains an identifier of at least one compartment corresponding to the mapping. Often, the number of compartment identifiers specified are less than all of the compartments to which a requesting individual is to be granted access to the tote. Based on the identifier and the mapping, the access system controller can control the one or more access doors to align with the at least one compartment in response to instructions from the central control circuit and/or unlock one or more doors enabling the requesting individual to access and retrieve each product within the at least one compartment of the multiple compartment tote while simultaneously preventing access to the remainder of the plurality of compartments of the multiple compartment tote.

The central control circuit 202 configured to receive a request for a product to be transported to an access station. This request may be received through a user interface 608 of the access system 602 (e.g., a display, buttons, touch screen, mouse, touch pad, scroll wheel, etc.), a user interface of a customer or workers user interface unit 218 (e.g., smartphone, tablet, handheld scanners, communications systems, etc.), the central control circuit, through a remote server (e.g., a shopping server accessible over the Internet and associated with the retail store), or other such input. The central control circuit can identify a particular access station of the plurality of access stations to which the requested product is to be routed. In some instances, the access station is identified based on the access station submitting the request through the user interface 608, based on the product requested (e.g., routed to an access station in an area of the retail store associated with that product), to an access station associated with a location of the request (e.g., customer or worker's user interface unit may provide a location), and/or other such methods. The inventory tracking system can be access to identify a storage cell 502 in which the requested product is stored. Again, in some implementations, the product may be housed within a tote that is positioned within the storage cell.

The central control circuit can further identify an available unmanned vehicle 122 of the plurality of unmanned vehicles, and communicate to the identified unmanned vehicle directing the unmanned vehicle to retrieve the identified tote from the identified storage cell and transport the tote to the identified access station. Further, the central control system in identifying the access station can be configured to identify the access station that is exterior to the retail store (e.g., exterior and adjacent an entrance to the store, located in the parking lot, etc.). In directing an unmanned vehicle, the central control system can direct the unmanned vehicle to an access passage of the plurality of access passages that links the exterior access station with the racks. FIG. 3 illustrates that one or more of the access stations 120 may be external to the retail store.

Figure 8:
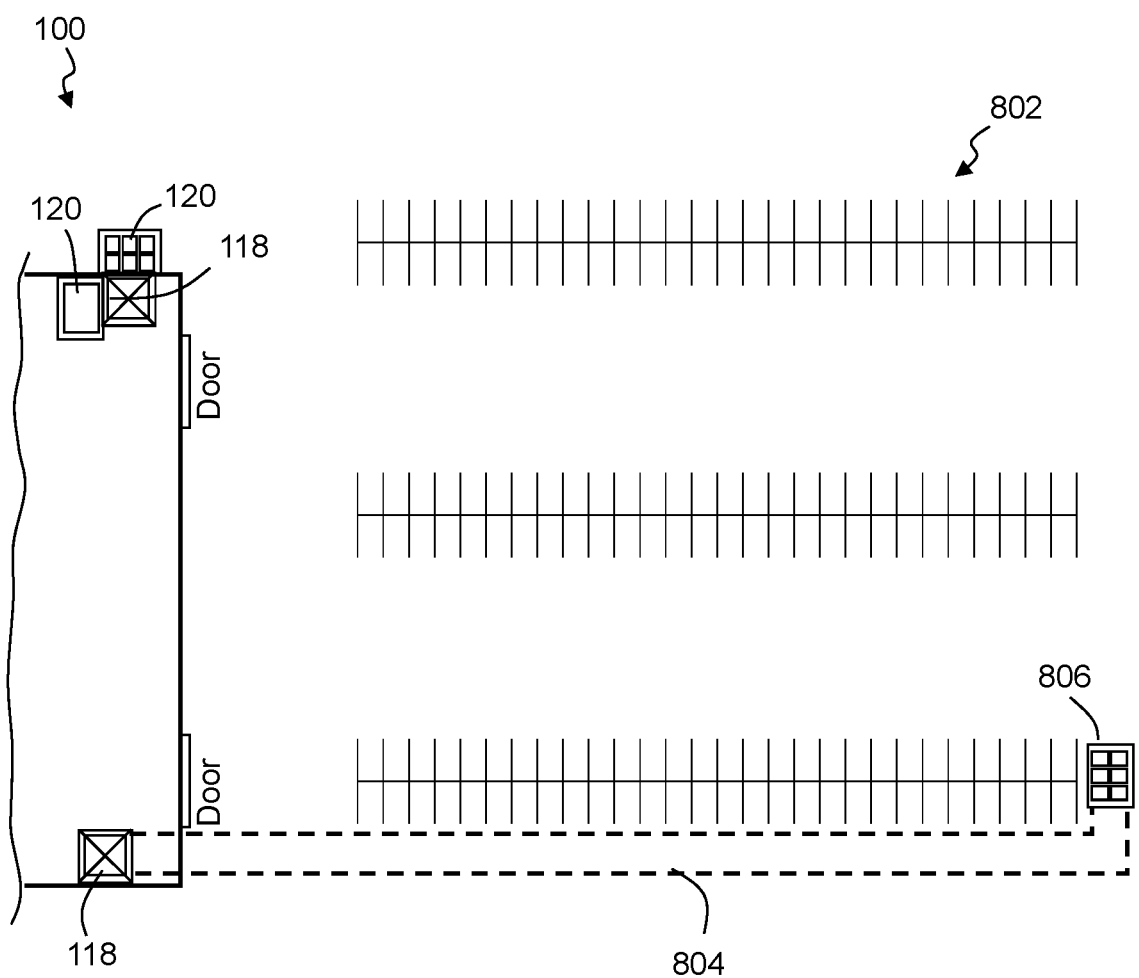
FIG. 8 illustrates a simplified block diagram overhead view of a retail store with a portion of the parking lot of the retail store, in accordance with some embodiments.

FIG. 8 illustrates a simplified block diagram overhead view of a retail store 100 with a portion of the parking lot 802 of the retail store, in accordance with some embodiments. In some embodiments some or all of an access passage may be subterranean and/or at least a portion may extend under the retail store. For example, an access passage have a portion having a first length that extends from the racks positioned above the dropdown ceiling to a subterranean access passage 804 that is positioned below at least a portion of the retail store, the parking lot or the like, and having a second length extending between the first length of the access passage along the subterranean passage to one or more exterior access stations 806 located exterior of the retail store. Additionally or alternatively, some embodiments include one or more access passages that include a portion that is elevated above the ground for at least a portion of a length of the access passage.

Figure 9:
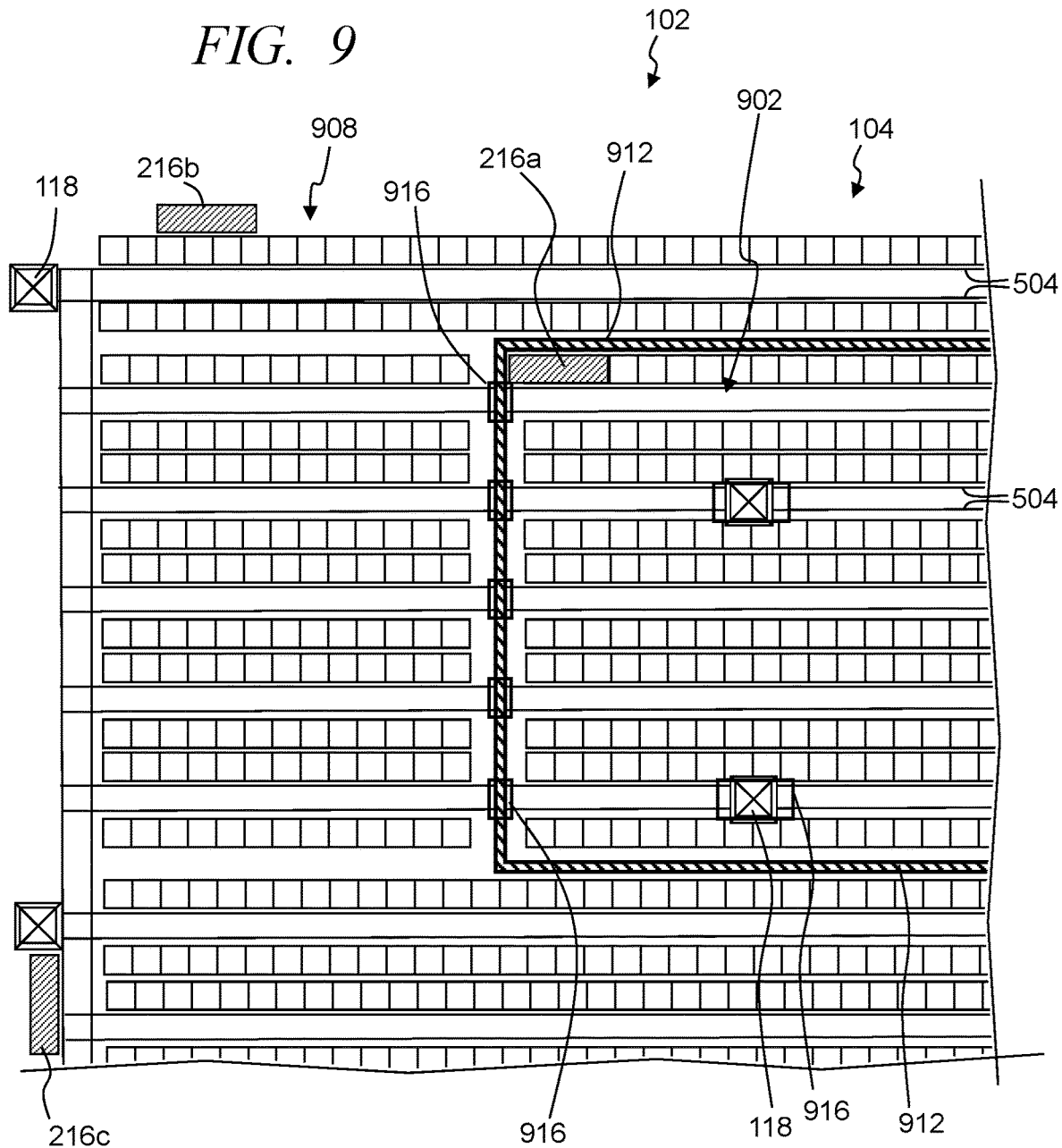
FIG. 9 illustrates a simplified overhead view of a portion of an exemplary rack system having a temperature control zone, in accordance with some embodiments.

FIG. 9 illustrates a simplified overhead view of a portion of an exemplary rack system 104 having a temperature control zone 902, in accordance with some embodiments. In some embodiments, the products stored within the rack system are grouped. The grouping may be based on one or more factors. For example, some products may be grouped based on the temperature at which these products are to be maintained (e.g., room temperature, refrigerated below a first refrigeration threshold, refrigerated below a second refrigeration threshold, frozen below a first frozen threshold, and the like. The storage and retrieval system 102, in some implementations, includes temperature controlled zone or regions of the storage rack, where one or more of such temperature control zone are often in the space above the dropdown ceiling. Further, one or more access passages may be cooperated with those temperature control zones. For example, a storage and retrieval system 102 in some embodiments may include a first temperature zone 902 surrounding a first portion of the rack system 104 positioned above the dropdown ceiling. One or more first temperature control systems 216a cooperated with the first temperature zone 902 and is configured to maintain the first temperature zone below a first temperature threshold (e.g., below 30 degrees Fahrenheit). The system may include a second temperature zone 908 surrounding a second portion of the rack system positioned above the dropdown ceiling. In some implementations, the second temperature zone 908 is separated from the first temperature zone 902 by at least one or more insulating barriers 912, walls, drapes, plastic strips, etc. One or more second temperature control systems 216b-216c cooperated with the second temperature zone 908 and configured to maintain the second temperature control zone within a threshold of a second temperature which is different than the first temperature threshold. Some embodiments include one or more movable barriers 916, doors, flaps, etc. that are cooperated with at least the insulating barrier 912 and positioned relative to at least a one or more pairs of rails 504 of the plurality of pairs of rails of the rail system. These movable barriers enable the plurality of unmanned vehicles 122 to move between the different temperature zones 902, 908 while reducing the exchange of temperature between the neighboring different temperature zones. In some instances, the movable barriers may be mechanically operated doors that are triggered by one or more sensors detecting movement of an unmanned vehicle as it approaches the movable barrier. Similarly, one or more control signals may be communicated to a motorized system to activate the door based on input from the central control circuit 202, which may be an instruction to open at that time, open in response to sensor data indicating an approaching unmanned vehicle, or the like. Additionally or alternatively, the unmanned vehicle may be configured to communicate (e.g., wirelessly, via the rails, etc.) to the door system to cause the door to open as the unmanned vehicle approaches. Other methods and/or triggers may be used individually or in some combination to activate the movable barrier. In other instances, the unmanned vehicle may physically contact the movable barrier to induce movement (e.g., contacting a button on the movable barrier, pushing the movable barrier (e.g., hinged door, strips of hanging plastic, etc.), or otherwise cause the movement. Further, some embodiments incorporate one or more access passages 118 of the plurality of access passages in the different temperature zones. This can include one or more access passages extending between the first temperature zone 902 and a particular access station positioned on the sales floor. The particular access station may similarly be incorporated into a temperature control area on the sales floor (e.g., within a refrigerated portion), may include temperature control systems, or the like. Some embodiments may include one or more movable barriers 916 of the first temperature zone 902 and positioned along a length of the particular access passage.

As described above, some embodiments include one or more inventory tracking systems 204 that at least tracks the location of items of inventory within the retail store. This can include tracking particular identifying information of products through one or more sensor systems (e.g., RFID tags of items, bar codes of items, etc.), tracking identifying information of totes within which a product has been placed (e.g., tote RFID tags, tote bar codes, etc.), tracking the movement of unmanned vehicles instructed to transport items (e.g., vehicle RFID tags, vehicle bar codes, communication of location information received from a vehicle, etc.), other such methods or a combination of two or more of such methods. Typically, the inventory tracking system further receives input regarding orders received from a distribution or other source (e.g., at the loading dock 302, or other area of the retail store), purchase information received from point of sale systems 212, worker picking information, worker stocking information, damage report information, product expiration information, and/or other such information to track quantities of products and/or their locations within the retail store. Further, in some embodiments, the central control circuit and/or inventory tracking system apply one or more rules of a set of inventory organization rules relative to the products positioned within the rack system 104 to provide organization of the products to enhance, simplify and speed the placement and/or subsequent retrieval of items to and from the rack system. The organization rules apply one or more factors and/or thresholds. Some rules can consider rates of sales relative to product placement relative to access passages. Further, some rules consider the organization of products on the sales floor in coordinating the organization in the rack system with the organization of products on the sales floor. Still other rules are applied in determining temperature requirements. For example, rules can be applied relative to higher sales rate products directing such product to be placed closer to the access passages 118, products exceeding one or more threshold weights and/or sizes may be placed closer to the loading docks, temperature controlled items can be placed in appropriate temperature controlled zones, other such organization rules, and often a combination of such organization rules can be applied. Further, in some instances, rules are applied to the inventory in the racks to organize the products in the racks to correspond to product organization on the sales floor. As such, in some applications, the inventory tracking system 204 is configured to maintain a mapping of locations on the sales floor of different products and/or in the rack system. The central control circuit 202 can be configured to communicate with the inventory tracking system 204 to obtain mapping location information and to direct the placement of totes to locations within the plurality of racks to be positioned above the sales floor corresponding to where that product within the tote is mapped on the sales floor. Accordingly, products within the rack system can be positioned in close proximity to access passages that are closest to the portion of the sales floor where the products are to be stocked and/or where customers are more likely to request those products. Additionally or alternatively, one or more product organization rules can be applied to direct some products within the rack system to be organized with some products positioned closer to access passages and access stations that are near or adjacent point of sale systems of the retail store. This allows unmanned vehicles to more quickly transport products to customers at a point of sale area of the retail store allowing customers to retrieve products requested and/or after purchased at a location close to the point of purchase and/or near an exit of the retail store. In some embodiments, a set of multiple different access stations can be configured near the one or more point of sale systems 212. Products requested by customers may be queued in one or more areas of the rack system, rail system and/or access passage. Upon completing a purchase, the customer can go to one of the access stations near the point of sale systems and retrieve the one or more requested items. Similarly, a customer may request an item be taken to an access station in the parking lot near where the customer parked her/his car. The application of these rules enhances the performance of the central control circuit and/or inventory tracking system by speeding processing, limiting consideration of potentially adverse product placement, reduces processing time, and enhances processing efficiency.

The access passages 118 and access stations 120 can additionally or alternatively be arranged to simplify the movement of the products into the rack system and/or retrieval of products from the rack system. In some embodiments access passages 118 are arranged for different zones of the sales floor. For example, a set of multiple access passages of the plurality of access passages can be positioned to each provide access to one of a plurality of predefined zones of the sales floor corresponding to an organization of products (e.g., produce zone, dairy zone, drinks zone, meat zone, baked goods zone, home and garden zone, baby clothes zone, shoe zone, electronics zone, etc.).

As described above, in some embodiments, multiple access stations 120 and/or access passages 118 can be arranged at and/or along different portions of one or more loading docks 302 and/or zones of the retail store. The plurality of access passages, in some implementation, can include one or more sets of loading dock access passages 118 physically located at, adjacent to or otherwise proximate to the loading dock 302 and/or bay doors 308 of the retail store. The set of loading dock access passages and/or corresponding loading dock access stations may be interior, exterior or a combination of interior and exterior to the retail store. Further, in some instances, the loading dock access stations are simplified stations without a door, enclosure or the like to simplify access of the queued totes and/or unmanned vehicles. In some instances, the loading dock access passages do not include an access station and instead one or more rail pairs of the rail system extends along one or more portions of the length of the loading bay and totes where totes are retrieved and transported into the rack system. Totes may be retrieved by the unmanned vehicles as the vehicle enters the queue to await products to be placed into the totes. In some instances, one or more tote loading stations are configured at one or more locations along the loading dock and/or within the back storage area where a loading system retrieves products and places then into the tote and/or compartment of the tote. One or more sensor systems track the item retrieved, the tote and/or compartment into which the item is placed, and/or the unmanned vehicle transporting the tote. Additionally or alternatively, workers may place items into totes. Again, one or more sensor systems may track the item, tote, compartment and/or unmanned vehicle. In instances the worker may activate one or more of the sensor systems. Automated sensor systems may additionally or alternatively be implemented at one or more locations along the tote loading system. In some embodiments, the set of loading dock access passages may include one or more return access passages configured to enable empty totes to be queued to receive one or more products delivered to the retail store at one of the loading docks. Similarly, the set of loading dock access passages may include a plurality of storing access passages configured to enable multiple different unmanned vehicles to simultaneously move totes into which products delivered to the retail store are transported to the rack system. The central control system can receive, for each tote into which a product delivered to the retail store at the loading dock is placed, an identifier of at least one product placed into a first tote, obtain a first storage cell identifier of a first storage cell of the plurality of storage cells into which the tote is to be placed, and notify a first unmanned vehicle to transport the first tote through a first storing access passage of the plurality of storing access passages and place the first tote in the first storage cell. The first storage cell may be identified based on an organization of products and the product identifier, a rate of sale of the product, a temperature requirement of the product, a back log of products to move from the loading dock, an expected request for picking and/or request by a customer for that product, other such factors, or a combination of two or more of such factors. For example, a product may be placed closer to an access passage when it is expected that there is a greater demand from that product and/or it is expected to be moved to the sales floor within one or more thresholds of time.

Some embodiments utilize the access passages, unmanned vehicles and/or the access stations to return products to the rack system. Such returns may be initiated by customers, workers or the like. In some embodiments, for example, a first access station 120 can include a user interface 608 that is communicatively coupled with the central control circuit 202 and configured to enable a user to notify the central control circuit of a return product to be moved from the sales floor to the rack system. The central control circuit can identify an available or soon to be available unmanned vehicle and direct that identified unmanned vehicle to transport a tote of the plurality of totes to the first access station to receive the return product. One or more sensor systems at the access station can acquire an identifier of the product (e.g., RFID, bar code, image capture, other such information or combination of such information) and communicate that to the central control circuit. The central control circuit can receive the identifier information of the return product, and determine based on the identifier of the return product a first storage cell into which the first tote is to be placed while the first tote stores the return product. Typically, the central control circuit communicates with the inventory tracking system to receive the identifier of the first storage cell. The storage cell may be identified based on one or more factors such as but not limited to state of the product (e.g., damaged, above a certain temperatures threshold, type of product, product organization within the rack system, expected demand of the product, etc.). The central control circuit can direct the first unmanned vehicle to the first storage cell to cause the unmanned vehicle to transport the tote and product to the first storage cell.

Figure 10:
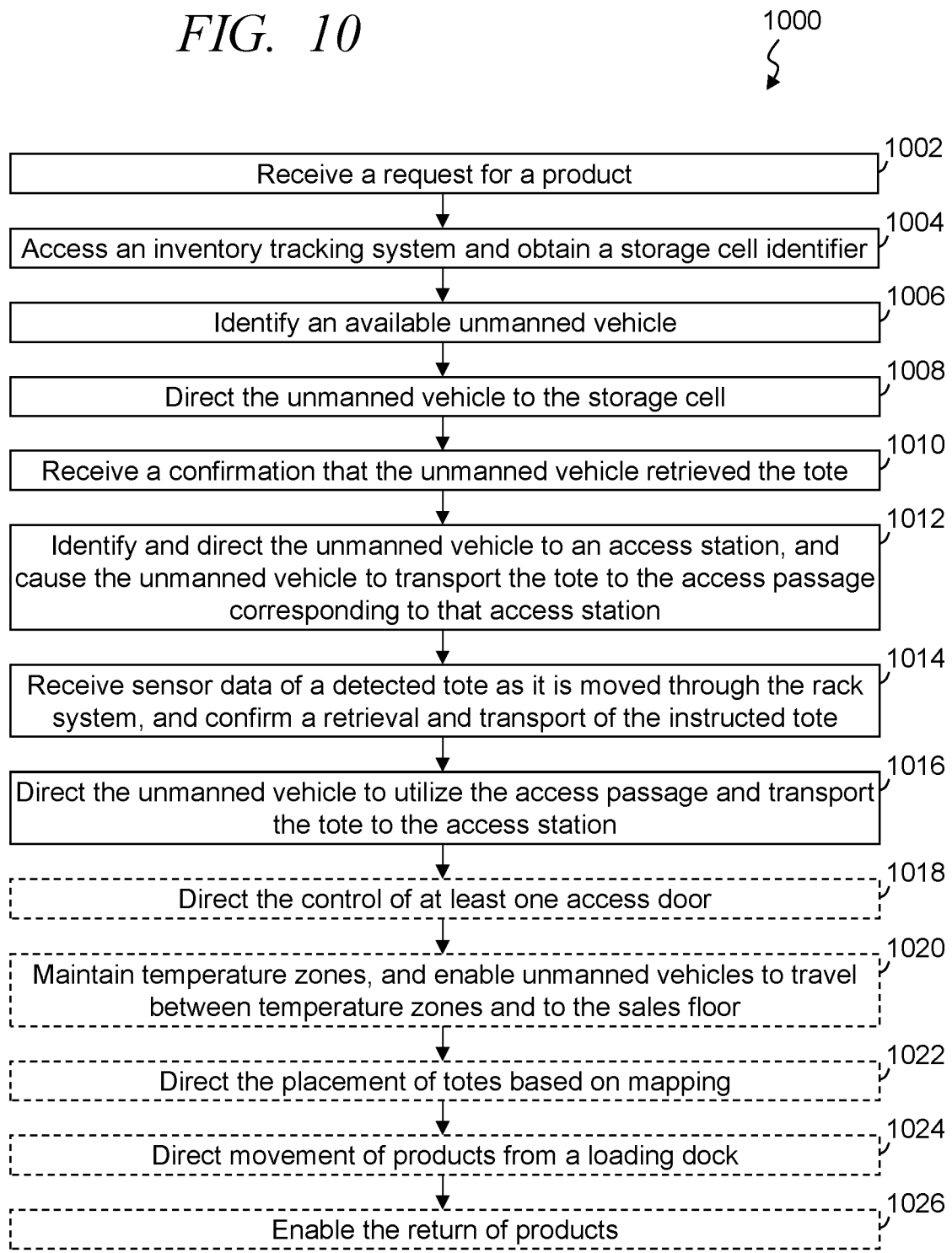
FIG. 10 illustrates a simplified flow diagram of an exemplary process of storing and retrieving products at a retail store to capitalize on unused and/or underutilized areas of the retail store, in accordance with some embodiments.

FIG. 10 illustrates a simplified flow diagram of an exemplary process 1000 of storing and retrieving products at a retail store to capitalize on unused and/or underutilized areas of the retail store, in accordance with some embodiments. In step 1002 a request receive at the retail store inventory central control circuit 202 for one or more particular products of hundreds of thousands of products stored and available for sale at a retail store. In step 1004, an inventory tracking system 204 of the retail store is accessed and a storage cell location identifier is obtained by the central control circuit from the inventory tracking system for a first storage cell within the rack system 104 of the retail store. Again, in some embodiments some or all of the rack system 104 may be positioned above a dropdown ceiling 106 of the retail store. The rack system can extend over some and typically at least a majority of the sales floor 108. Typically, the sales floor includes multiple product support devices 110 (shelves, bins, racks, etc.) supporting the products offered for sale. The product supports are arranged on the sales floor and separated to form aisles 112 along which customers move in order to locate and select desired products for purchase from the retail store. The rack system 104 includes a plurality of racks 114, one or more rail systems 116 and a plurality of access passages 118. The plurality of racks can be organized in a plurality of rows with each row having a plurality of aligned racks, wherein each rack comprises a plurality of storage cells 502. At least some of the plurality of storage cells are configured to receive a reusable storage tote 134 that is configured to receive and maintain at least one product of the hundreds of thousands of products offered for sale by the retail store. In some embodiments, one or more of the storage cells can be configured to receive one or more products without a tote. For example, some products may be of a size greater than a first tote size and instead the storage cell may be configured to receive just the product. Additionally or alternatively, different sized totes, portable bases, pallets and/or other such support devices that can be utilized by the system and storage cells configured to receive these different sized totes, portable bases, pallets, and/or other such support devices. Similarly, different sized unmanned vehicles may be utilized to transport different sized support devices. The rail system 116 can include a grid of a plurality of pairs of rails that are cooperated and extending at least vertically and horizontally between rows of racks of the plurality of racks and the storage cells of racks.

In step 1006, an available or soon to be available unmanned vehicle of a plurality of unmanned vehicles can be identified. In step 1008, the unmanned vehicle can be directed to the first storage cell. Again, the unmanned vehicle can comprises a vehicle control circuit 402, at least one motor 404 controlled by the vehicle control circuit, a propulsion system 406 operatively coupled with at least one motor and configured to induce movement of the unmanned vehicle in response to being driven by the motor, and a tote or product retrieval system 408. In step 1010, a confirmation is received that the first unmanned vehicle has retrieved the first tote.

In step 1012, a first access station 120 of the plurality of access stations to which the first product is to be routed is identified, and the first unmanned vehicle is directed to the first access station. The access stations can be positioned at one of various different locations throughout the sales floor and an exterior of the retail store. Further, each access station is physically cooperated with one of the plurality of access passages 118 of the rack system. Further, the first unmanned vehicle is directed and caused to transport the first tote to a corresponding first access passage of the plurality of access passages that physically corresponds to the first access station. Again, the access passages typically cooperate the plurality of racks with at least one of the plurality of access stations. Further, in some embodiments, at least some of the access passages include some of the rail system 116 enabling the unmanned vehicles to transport the totes between the racks and the corresponding access stations. Additionally or alternatively, other lift systems can be utilized with the access passages (e.g., elevator type systems, escalator type systems, etc.). In some embodiments, the central control circuit applies one or more sets of vehicle allocation rules in selecting unmanned vehicles to perform various tasks. Some such rules can include but are not limited to comparing stored power to one or more thresholds, rules to evaluate location of vehicles relative to location of an intended storage cell, traffic between an unmanned vehicle and an intended storage cell, size and/or capacity rules can be considered in determining whether an unmanned vehicle is capable of performing the task, and other such rules. Still further, rules may dictate whether an unmanned vehicle has priority over one or more other unmanned vehicles. For example, the priority rules may dictate that unmanned vehicles retrieving products from storage cells have higher priority over unmanned vehicles transporting products to a storage cell; unmanned vehicles retrieving products for customers can be designated with a higher priority than vehicles obtaining products for a worker; products to be delivered to a higher traffic access station can be given a higher priority over unmanned vehicles transporting a product to an access station with lower traffic; vehicles being routed to a parking lot access station may be granted higher priority than unmanned vehicles routed to an in-store access station; and/or other such priority rules. Such vehicle selection rules greatly enhance the performance of the central control circuit by in part speeding processing, limiting consideration of potentially vehicles, reducing processing time, and enhancing processing efficiency.

In step 1014 sensor data is received from one or more sensor systems of a plurality of sensor systems 136 which are communicatively coupled with at least the central control circuit and configured to detect totes, products, unmanned vehicles, etc. as they are moved through the rack system, and a retrieval and transport of the first tote is implemented. In step 1016, the first unmanned vehicle is directed to utilize the first access passage and transport the first tote to the first access station.

As described above, a set of multiple totes of the plurality of totes can include multiple compartments each configured to receive one or more products. As such, the identification and/or selection of the first tote can comprise identifying that the first product is stored within a first compartment of multiple different compartments 702 of the first tote, wherein at least a first, obtaining a mapping of the compartments of the multiple compartment first tote, and obtaining an identifier of at least one compartment and less than all of the compartments to which a requesting individual is to be granted access to the tote, including an identifier of the first compartment. Some embodiments include step 1018 where at least one access door of the first access station can be directed to open. Again, some access stations each include an access system 602 with an access system controller 604 and at least one access door 606 movably positioned to prevent access and allow access at least a portion of a product retrieval opening within the access station that is configured to align with a tote when placed within the access station. In directing the access door of the first access station to open, some embodiments can direct the control of the at least one access door to align with the at least one compartment in response to instructions from the central control circuit enabling the requesting individual to access and retrieve each product within the at least one compartment of the first multiple compartment tote while simultaneously preventing access to the remainder of the plurality of compartments of the multiple compartment first tote.

In some embodiments, the identification of the first access station can include identifying the first access station is exterior to the retail store, and directing the first unmanned vehicle to the first access passage of the plurality of access passages that links the first access station with the racks. In some implementations, one or more access passages may include at least portion of the access passage as subterranean. Accordingly, in some embodiments, in directing the first unmanned vehicle to the access passage can include causing the first unmanned vehicle to travel along a first length of the first access passage extending from the racks positioned above the dropdown ceiling to a subterranean passage positioned below at least a portion of the retail store, and along a second length of the first access passage extending between the first length of the first access passage along the subterranean passage 804 to the first access station located at an exterior of the retail store.

Some embodiments include temperature controlled areas. As such, some embodiments include step 1020 where one or more temperature zones can be maintained with unmanned vehicles directed to relevant temperature zones based on the products to be transported to or retrieved from the temperature zones, and unmanned vehicles are enabled to move between temperature zones as well as the sales floor corresponding to those temperature zones. For example, a first temperature zone surrounding a first portion of the rack system positioned above the dropdown ceiling can be maintained, through a first temperature control system, below a first temperature threshold, while a second temperature zone surrounding a second portion of the rack system positioned above the dropdown ceiling can be maintained within a threshold of a second temperature which is different than the first temperature threshold. The second temperature zone can be separated from the first temperature area by at least an insulating barrier 912. The plurality of unmanned vehicles can be enabled to move between the first temperature zone and the second temperature zone through a movable barrier 916, which in some instances is cooperated with the insulating barrier, and positioned relative to at least a pair of rails of the plurality of pairs of rails. Further, in providing access to an access passage some embodiments enable the plurality of unmanned vehicles access the first access passage of the plurality of access passages extending between the first temperature zone and a first access station positioned on the sales floor. In some instances, the unmanned vehicle travels through a second movable barrier 916 of the first temperature zone and positioned along a length of the first access passage.

The retail store typically organizes products according to categories (e.g., frozen foods, meat, dairy, cereals, produce, drinks, etc.). As such, some embodiments include step 1022 where one or more mappings are maintained of locations on the sales floor of different products and/or mapping of products within the rack system, and direct the placement of and retrieval of totes to and from locations within the plurality of racks to be positioned above the sales floor corresponding to where that product is mapped on the sales floor. A set of multiple access passages of the plurality of access passages can be arranged each too provide access to one of a plurality of predefined zones of the sales floor corresponding to an organization of products. Similarly, in identifying a storage cell and/or directing an unmanned vehicle to transport a tote and/or product to a storage cell, some embodiments direct unmanned vehicles to loading bay access passages to move products delivered to the retail store to the rack system. Some embodiments queue a plurality of totes to receive products delivered to a delivery dock at the retail store. At least some of the access passages can comprise a set of loading dock access passages physically located proximate the loading dock 302 of the retail store. Some embodiments include at least one return access passage configured to enable empty totes to be queued to receive one or more products delivered to the retail store at one of the loading docks. A conveyor system can be utilized to move totes and/or products as totes are loaded and positioned to be retrieved by an unmanned vehicle or otherwise moved (e.g., by an employee to a staging area, a pick area, etc.). A plurality of storing access passages can be included at or near the loading dock and are configured to enable multiple different unmanned vehicles to simultaneously move totes into which products delivered to the retail store are transported to the rack system.

Some embodiments include step 1024 where, for each tote into which a product delivered to the retail store at the loading dock is placed, an identifier is received of at least one product placed into the corresponding tote. Further, for each tote to be transported from the loading dock, a storage cell identifier of a storage cell of the plurality of storage cells is obtained into which the tote is to be placed. Additionally or alternatively, for each tote, an unmanned vehicle is identified and that unmanned vehicle is notified or directed to transport the tote through a storing access passage of a plurality of storing access passages and place the tote in the identified storage cell.

Some embodiments include step 1026 enabling product to be returned to the rack system. In some implementations, an access station is identified (e.g., receive, through a user interface of the access station, a user interface unit, etc.). A notification can be received of a return product to be moved from the sales floor to the rack system. An unmanned vehicle can be directed to transport a tote to the access station to receive a return product. An identifier can be received of the return product, and based on the identifier of the return product a storage cell can be determined into which the tote is to be placed while the tote stores the return product. The unmanned vehicle can be directed to transport the tote to the identified storage cell.

Figure 11:
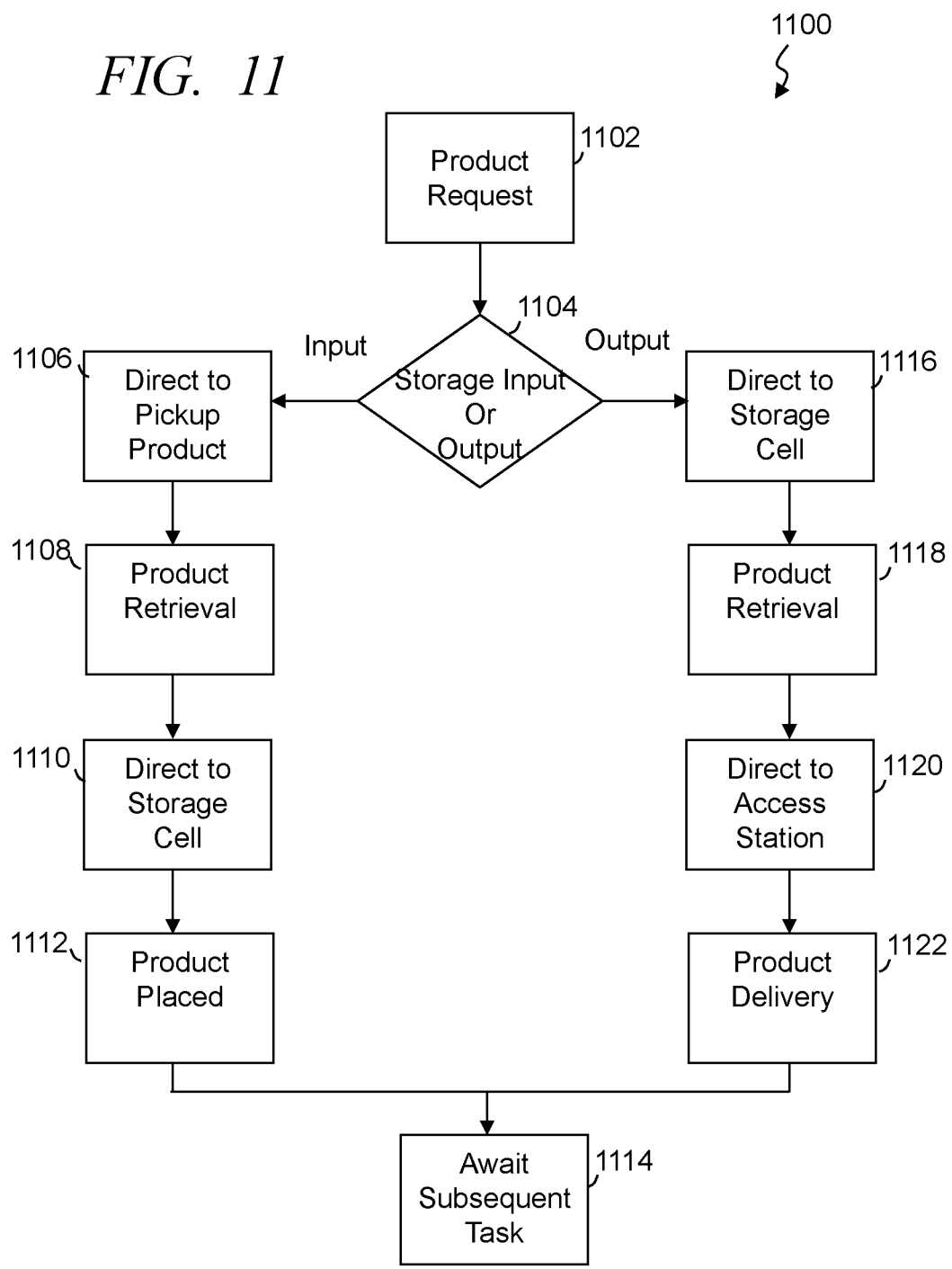
FIG. 11 illustrates a simplified flow diagram of an exemplary process of product storage and retrieval, in accordance with some embodiments.

As described above, the system can be utilized to distribute products to the storage cells of the rack system in response to deliveries at the retail store and/or product returns, as well as retrieve products for customers and/or workers for shelf stocking. FIG. 11 illustrates a simplified flow diagram of an exemplary process 1100 of product storage and retrieval, in accordance with some embodiments. In step 1102, a product request is detected. The request can be a request to move products from a loading dock to the rack system (e.g., in response to a request from a worker at the loading dock, a request from the inventory system, etc.), or a request to return a product to the rack system, or a request to retrieve a product or the like. In step 1104, it is determined whether the request is to retrieve a product from the rack system or move a product to the rack system. When the product is inputted and to be moved to the storage rack system, the process advances to step 1106 where an unmanned vehicle is routed to the product location. This may be based on sensor data, the request and/or other such information. In step 1108, sensor data is used to confirm the unmanned vehicle retrieved the product. In some implementations, further sensor data is used by the inventory tracking system to continue to track the movement of the product and/or unmanned vehicle as it moves through the system and is eventually placed into an intended storage cell.

In step 1110, the inventory tracking system and/or the central control circuit provide a storage cell where the product is to be placed. Again, this may be based on the type of product, an organization of products within the storage rack system, expected rate of sale of the product and/or other such information. Further, in some instances, routing information is provided to the unmanned vehicle directed the unmanned vehicle to the intended storage location. In other instances, the unmanned vehicle locally stores a mapping of the storage rack system and autonomously determines a routing. Further, the routing may be dependent on current traffic within the rack system to avoid backlogs in the rack system and/or maintain some tracks at least at reduced traffic levels (e.g., to ensure quicker response in obtaining products for delivery to customers at an access station, an unmanned vehicle moving products to a storage cell may take a longer route, wait at one or more intersections, be instructed wait in a queue, and the like to keep some rails free or at reduced traffic levels). In step 1112, sensor data is received to confirm that the product and/or tote carrying the product is placed into the intended storage cell. This can include communications from sensor systems at the storage cell, communications from the unmanned vehicle, communications from the tote, and/or other such sensor information. The freed unmanned vehicle can then, in step 1114, be directed to a subsequent task or stages to await a subsequent task (e.g., subsequent product retrieval).

When products are to be retrieved from the rack system the process advances to step 1116 where one or more unmanned vehicles are directed to corresponding one or more storage cells to retrieve a relevant tote and/or product. Again, in some instances, the routing is provided to the unmanned vehicle, while in other instances routing is determined by the unmanned vehicle. Communication with other unmanned vehicles and/or the central control circuit can prevent collisions and/or backlogs. Further, in some instances, unmanned vehicles retrieving a product may have priority over other vehicles performing other tasks. Accordingly routing may take advantage of less utilized routes and/or other unmanned vehicles may be temporarily halted or slowed to allow the prioritized unmanned vehicle to move at a faster pace. In step 1118 sensor data is received confirming retrieval by the unmanned vehicle.

In step 1120 the unmanned vehicle is directed to a delivery location at the retail store (e.g., within the store, exterior to the store, in the parking lot, etc.). Often such delivery locations are at a particular access station. In step 1122 sensor data is used to confirm delivery at the intended access station or other location. In step 1114 the unmanned vehicle can be routed to a subsequent task or staged for a subsequent task.

Figure 12:
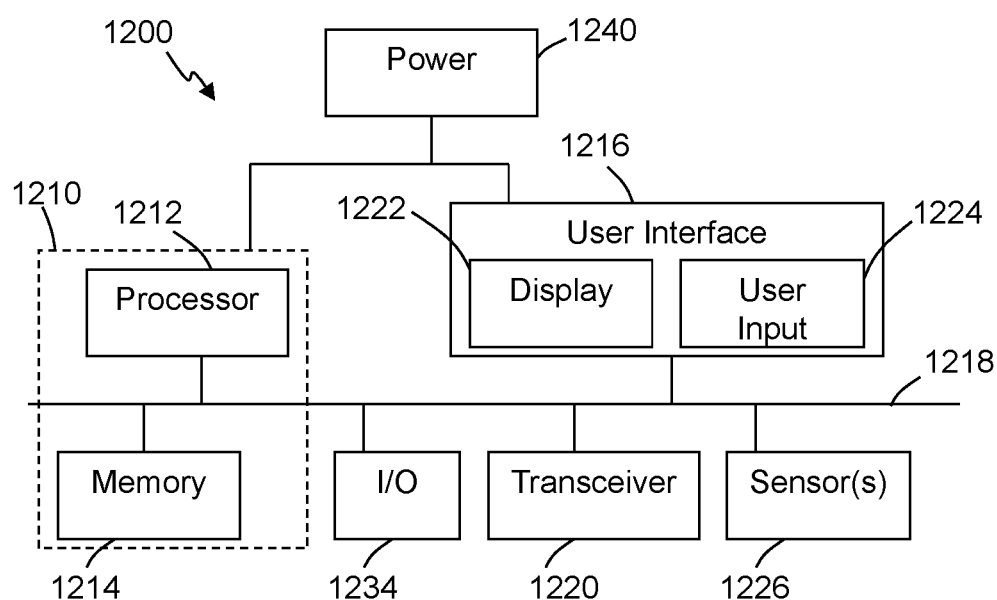
FIG. 12 illustrates an exemplary system for use in implementing methods, techniques, devices, apparatuses, systems, servers, sources and providing enhanced retail store product storage and retrieval environments, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 12 illustrates an exemplary system 1200 that may be used for implementing any of the components, circuits, circuitry, systems, functionality, apparatuses, processes, or devices of the storage and retrieval system 102, and/or other above or below mentioned systems or devices, or parts of such circuits, circuitry, functionality, systems, apparatuses, processes, or devices. For example, the system 1200 may be used to implement some or all of the access stations 120, unmanned vehicles 122, sensor systems 136, control system 200, central control circuit 202, inventory tracking system 204, mapping system 210, point of sale system 212, temperature control system 216, user interface units 218, vehicle control circuit 402, access system 602, access system controller 604, and/or other such components, circuitry, functionality and/or devices. However, the use of the system 1200 or any portion thereof is certainly not required.

By way of example, the system 1200 may comprise a control circuit or processor module 1212, memory 1214, and one or more communication links, paths, buses or the like 1218. Some embodiments may include one or more user interfaces 1216, and/or one or more internal and/or external power sources or supplies 1240. The control circuit 1212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1212 can be part of control circuitry and/or a control system 1210, which may be implemented through one or more processors with access to one or more memory 1214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1200 may be used to implement one or more of the above or below, or parts of, components, circuits, systems, processes and the like.

The user interface 1216 can allow a user to interact with the system 1200 and receive information through the system. In some instances, the user interface 1216 includes a display 1222 and/or one or more user inputs 1224, such as buttons, touch screen, track ball, keyboard, mouse, etc., which can be part of or wired or wirelessly coupled with the system 1200. Typically, the system 1200 further includes one or more communication interfaces, ports, transceivers 1220 and the like allowing the system 1200 to communicate over a communication bus, a distributed computer and/or communication network 206 (e.g., a local area network (LAN), the Internet, wide area network (WAN), etc.), communication link 1218, other networks or communication channels with other devices and/or other such communications or combination of two or more of such communication methods. Further the transceiver 1220 can be configured for wired, wireless, optical, fiber optical cable, satellite, or other such communication configurations or combinations of two or more of such communications. Some embodiments include one or more input/output (I/O) ports 1234 that allow one or more devices to couple with the system 1200. The I/O ports can be substantially any relevant port or combinations of ports, such as but not limited to USB, Ethernet, or other such ports. The I/O interface 1234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors and/or sensor systems 1226 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1200 comprises an example of a control and/or processor-based system with the control circuit 1212. Again, the control circuit 1212 can be implemented through one or more processors, controllers, central processing units, logic, software and the like. Further, in some implementations the control circuit 1212 may provide multiprocessor functionality.

The memory 1214, which can be accessed by the control circuit 1212, typically includes one or more processor-readable and/or computer-readable media accessed by at least the control circuit 1212, and can include volatile and/or nonvolatile media, such as RAM, ROM, EEPROM, flash memory and/or other memory technology. Further, the memory 1214 is shown as internal to the control system 1210; however, the memory 1214 can be internal, external or a combination of internal and external memory. Similarly, some or all of the memory 1214 can be internal, external or a combination of internal and external memory of the control circuit 1212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 206. The memory 1214 can store code, software, executables, scripts, data, content, lists, programming, programs, log or history data, user information, customer information, product information, and the like. While FIG. 12 illustrates the various components being coupled together via a bus, it is understood that the various components may actually be coupled to the control circuit and/or one or more other components directly.

In some embodiments, the product storage and retrieval system can store and retrieve temperature sensitive items (e.g., cold-chain) by using climate-controlled storage areas 902 from which the unmanned vehicles place and retrieve items at the time of dispensation to customer, utilizing totes with climate control ability cooperated with the totes (e.g., a small refrigeration unit, Peltier cooling, or the like that can be powered by onboard battery, fuel cell, power coupling within the storage cell 502, etc.). In some embodiments, the central control circuit 202 provides overarching coordination of movement of the unmanned vehicles and totes directing the unmanned vehicles regarding where to go and what to retrieve or deliver. Further, in some applications, the central control circuit communicates with a remote ordering system (e.g., an on-line ordering system). Status information can be maintained based on sensor information, including but not limited to the location of an item requested, state of retrieval or movement within the retail store, etc. This may be communicated to an access station, a user interface unit, a remote system and the like. The system utilizes currently empty space and/or underutilized space for staging and moving products to an end destination without interfering with the humans moving about the sales floor. Further, in some applications the system provides conveyance of items through space above shelving. The items can be pre-staged and moved as individual products, in totes, bins or other such carriers. The totes can be transferred down from the rack system conveyance level at one of multiple access stations and/or a convenient location to be retrieved by a customer or worker (e.g., ready for eventual shelf stocking). The system can dynamically allocation unmanned vehicles for the transfer of product to the rack system and from the rack system to an intended destination (e.g., access station, pick staging area, etc.).

In some embodiments, retail store inventory storage and retrieval systems, apparatuses and corresponding methods performed by the systems, comprise: a rack system positioned above a dropdown ceiling of a retail store and extending over at least a majority of a sales floor comprising product support devices supporting products offered for sale and separated by aisles along which customers move in order to locate and select desired products for purchase from the retail store, wherein the rack system comprises: a plurality of racks, a rail system and the plurality of access passages; a retail store inventory central control circuit; an inventory tracking system communicatively coupled with the central control circuit; a plurality of unmanned vehicles in wireless communication with the central control circuit, wherein each of the unmanned vehicles comprises a vehicle control circuit, at least one motor controlled by the vehicle control circuit, a propulsion system operatively coupled with the at least one motor and configured to induce movement of the unmanned vehicle in response to being driven by the motor, and a tote retrieval system; a plurality of access stations each positioned at various different locations throughout the sales floor and an exterior of the retail store, wherein each of the access stations is physically cooperated with one of the plurality of access passages of the rack system; and a plurality of sensor systems communicatively coupled with at least the central control circuit and configured to detect at least totes as they are moved through the rack system; wherein the plurality of racks are organized in a plurality of rows with each row having a plurality of aligned racks, wherein each rack comprises a plurality of storage cells configured to receive a reusable storage tote that is configured to receive and maintain at least one product of the hundreds of thousands of products offered for sale by the retail store; wherein the rail system comprises a grid of a plurality of pairs of rails that are cooperated and extending at least vertically and horizontally between rows of racks of the plurality of racks and the storage cells of racks; wherein each of the access passages cooperates the plurality of racks with at least one of the access stations and comprise some of the rail system enabling the unmanned vehicles to transport the totes between the racks and the access stations; and wherein the central control circuit is configured to receive a request for a first product, identify a first access station of the plurality of access stations to which the first product is to be routed, access the inventory tracking system to identify a first storage cell in which the first product is stored within a first tote, identify an available first unmanned vehicle of the plurality of unmanned vehicles, and communicate to the first unmanned vehicle directing the first unmanned vehicle to retrieve the first tote and transport the first tote to the first access station.

Further, some embodiments, provide methods of storing and retrieving products at a retail store, comprising: receiving, at a retail store inventory central control circuit, a request for a first product of hundreds of thousands of products stored and available for sale at a retail store; accessing an inventory tracking system of the retail store and obtaining a storage cell identifier from the inventory tracking system for a first storage cell within a rack system of the retail store positioned above a dropdown ceiling of the retail store and extending over at least a majority of a sales floor comprising product support devices supporting the products offered for sale and separated by aisles along which customers move in order to locate and select desired products for purchase from the retail store, wherein the rack system comprises: a plurality of racks, a rail system and a plurality of access passages; wherein the plurality of racks are organized in a plurality of rows with each row having a plurality of aligned racks, wherein each rack comprises a plurality of storage cells, including the first storage cell, with each of the plurality of storage cells being configured to receive a reusable storage tote that is configured to receive and maintain at least one product of the hundreds of thousands of products offered for sale by the retail store; and wherein the rail system comprises a grid of a plurality of pairs of rails that are cooperated and extending at least vertically and horizontally between rows of racks of the plurality of racks and the storage cells of racks; identifying an available first unmanned vehicle of a plurality of unmanned vehicles; directing the first unmanned vehicle to the first storage cell, wherein each of the unmanned vehicles comprises a vehicle control circuit, at least one motor controlled by the vehicle control circuit, a propulsion system operatively coupled with the at least one motor and configured to induce movement of the unmanned vehicle in response to being driven by the motor, and a tote retrieval system; receiving a confirmation that the first unmanned vehicle retrieved the first tote; identifying and directing the first unmanned vehicle to a first access station of a plurality of access stations to which the first product is to be routed, wherein each of the access stations is positioned at one of various different locations throughout the sales floor and an exterior of the retail store, wherein each of the access stations is physically cooperated with one of the plurality of access passages of the rack system, and causing the first unmanned vehicle to transport the first tote to a first access passage of the plurality of access passages that physically corresponds to the first access station, wherein each of the access passages cooperates the plurality of racks with at least one of the plurality of access stations and comprises some of the rail system enabling the unmanned vehicles to transport the totes between the racks and the corresponding access stations; receiving sensor data from one or more sensor systems of a plurality of sensor systems communicatively coupled with at least the central control circuit and configured to detect at least totes as they are moved through the rack system, and confirm a retrieval and transport of the first tote; and directing the first unmanned vehicle to utilize the first access passage and transport the first tote to the first access station.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail store inventory storage and retrieval system, comprising:
  a rack system positioned above a dropdown ceiling of a retail store and extending over at least a majority of a sales floor comprising product support devices supporting products offered for sale and separated by aisles along which customers move in order to locate and select desired products for purchase from the retail store, wherein the rack system comprises: a plurality of racks, a rail system and a plurality of access passages;
  a retail store inventory central control circuit;
  an inventory tracking system communicatively coupled with the central control circuit;
  a plurality of unmanned vehicles in wireless communication with the central control circuit, wherein each of the unmanned vehicles comprises a vehicle control circuit, at least one motor controlled by the vehicle control circuit, a propulsion system operatively coupled with the at least one motor and configured to induce movement of the unmanned vehicle in response to being driven by the motor, and a tote retrieval system;
  a plurality of access stations each positioned at various different locations throughout the sales floor and an exterior of the retail store, wherein each of the access stations is physically cooperated with one of the plurality of access passages of the rack system, and each of the access stations is accessible by customers for use by customers in requesting products while at the retail store; and
  a plurality of sensor systems, separate from the plurality of unmanned vehicles, communicatively coupled with at least the central control circuit and configured to detect at least totes as they are moved through the rack system;
  wherein the plurality of racks are organized in a plurality of rows with each row having multiple aligned racks of the plurality of racks, wherein each rack comprises a plurality of storage cells configured to receive a reusable storage tote that is configured to receive and maintain at least one product of thousands of products offered for sale by the retail store;
  wherein the rail system comprises a grid of a plurality of pairs of rails that are cooperated and extending at least vertically and horizontally between rows of racks of the plurality of racks and the storage cells of racks;
  wherein each of the access passages cooperates the plurality of racks with at least one of the access stations and comprise some of the rail system enabling the unmanned vehicles to transport the totes between the racks and the access stations; and
  wherein the central control circuit is configured to receive a request for a first product, identify a first access station of the plurality of access stations to which the first product is to be routed, access the inventory tracking system to identify a first storage cell in which the first product is stored within a first tote, identify an available first unmanned vehicle of the plurality of unmanned vehicles, and communicate to the first unmanned vehicle directing the first unmanned vehicle to retrieve the first tote and transport the first tote to the first access station.

2. The system of claim 1, wherein at least a first set of multiple totes of a plurality of totes comprise multiple compartments each configured to receive one product;
  wherein the access stations each comprises an access system comprising an access system controller and at least one access door movably positioned to prevent access and allow access at least a portion of a product retrieval opening within the access station that is configured to align with a tote when placed within the access station; and
  wherein the access system controller is configured to obtain a mapping of the compartments of a first multiple compartment tote, obtain an identifier of at least one compartment and less than all of the compartments to which a requesting individual is to be granted access to the tote, and controls the access door to align with the at least one compartment in response to instructions from the central control circuit enabling the requesting individual to access and retrieve each product within the at least one compartment of the first multiple compartment tote while simultaneously preventing access to the remainder of the multiple compartments of the first multiple compartment tote.

3. The system of claim 1, wherein the central control system in identifying the first access station is configured to identify the first access station is exterior to the retail store, and is configured to direct the first unmanned vehicle to a first access passage of the plurality of access passages that links the first access station with the racks.

4. The system of claim 1, further comprising:
  a first access passage of the plurality of access passages comprising:
    a first length extending from the racks positioned above the dropdown ceiling to a subterranean passage positioned below at least a portion of the retail store; and
    a second length extending between the first length of the first access passage along the subterranean passage to the first access station located at an exterior of the retail store.

5. The system of claim 1, further comprising:
  a plurality of suspension beams extending from a ceiling support of the retail store and secured with the rack system such that the rack system is suspended from the ceiling support.

6. The system of claim 1, further comprising:
  support columns distributed throughout the sales floor and extending from the sales floor through the dropdown ceiling and supporting the rack system.

7. The system of claim 1, further comprising:
  a first temperature zone surrounding a first portion of the rack system positioned above the dropdown ceiling;
  a first temperature control system cooperated with the first temperature zone and configured to maintain the first temperature zone below a first temperature threshold;
  a second temperature zone surrounding a second portion of the rack system positioned above the dropdown ceiling, wherein the second temperature zone is separated from the first temperature zone by at least a first insulating barrier;
  a second temperature control system cooperated with the second temperature zone and configured to maintain the second temperature control zone within a threshold of a second temperature which is different than the first temperature threshold;
a first movable barrier cooperated with the first insulating barrier and positioned relative to at least a first pair of rails of the plurality of pairs of rails enabling the plurality of unmanned vehicles to move between the first temperature zone and the second temperature zone;
a first access passage of the plurality of access passages extending between the first temperature zone and the first access station positioned on the sales floor; and
a second movable barrier of the first temperature zone and positioned along a length of the first access passage.

8. The system of claim 1, wherein the inventory tracking system is configured to maintain a mapping of locations on the sales floor of different products; and
the central control circuit is configured to communicate with the inventory tracking system to obtain mapping location information and to direct the placement of totes to locations within the plurality of racks to be positioned above the sales floor corresponding to where that product is mapped on the sales floor.

9. The system of claim 8, wherein a set of multiple access passages of the plurality of access passages are positioned to each provide access to one of a plurality of predefined zones of the sales floor corresponding to an organization of products.

10. The system of claim 1, wherein the plurality of access passages comprises a set of loading dock access passages physically located proximate a loading dock of the retail store wherein at least a return access passage is configured to enable empty totes to be queued to receive one or more products delivered to the retail store at the loading dock, and a plurality of storing access passages configured to enable multiple different unmanned vehicles to simultaneously move totes into which products delivered to the retail store are transported to the rack system; and
the central control system receives, for each tote into which a product delivered to the retail store at the loading dock is placed, an identifier of at least one product placed into the first tote, obtain the first storage cell identifier of the first storage cell of the plurality of storage cells, and notify the first unmanned vehicle to transport the first tote through a first storing access passage of the plurality of storing access passages and place the first tote in the first storage cell.

11. The system of claim 1, wherein the first access station comprises a user interface communicatively coupled with the central control circuit and configured to enable a user to notify the central control circuit of a return product to be moved from the sales floor to the rack system; and
wherein the central control circuit is configured to direct the first unmanned vehicle to transport the first tote of a plurality of totes to the first access station to receive the return product, receive an identifier of the return product, determine based on the identifier of the return product the first storage cell into which the first tote is to be placed while the first tote stores the return product, and directs the first unmanned vehicle to the first storage cell.

12. A method of storing and retrieving products at a retail store, comprising:
receiving, at a retail store inventory central control circuit, a request for a first product of thousands of products stored and available for sale at a retail store;
accessing an inventory tracking system of the retail store and obtaining a storage cell identifier from the inventory tracking system for a first storage cell within a rack system of the retail store positioned above a dropdown ceiling of the retail store and extending over at least a majority of a sales floor comprising product support devices supporting the products offered for sale and separated by aisles along which customers move in order to locate and select desired products for purchase from the retail store, wherein the rack system comprises: a plurality of racks, a rail system and a plurality of access passages; wherein the plurality of racks are organized in a plurality of rows with each row having multiple aligned racks of the plurality of racks, wherein each rack comprises a plurality of storage cells, including the first storage cell, with each of the plurality of storage cells being configured to receive a reusable storage tote that is configured to receive and maintain at least one product of the thousands of products offered for sale by the retail store; and wherein the rail system comprises a grid of a plurality of pairs of rails that are cooperated and extending at least vertically and horizontally between rows of racks of the plurality of racks and the storage cells of racks;
identifying an available first unmanned vehicle of a plurality of unmanned vehicles;
directing the first unmanned vehicle to the first storage cell, wherein each of the unmanned vehicles comprises a vehicle control circuit, at least one motor controlled by the vehicle control circuit, a propulsion system operatively coupled with the at least one motor and configured to induce movement of the unmanned vehicle in response to being driven by the motor, and a tote retrieval system;
receiving a confirmation that the first unmanned vehicle retrieved a first tote;
identifying and directing the first unmanned vehicle to a first access station of a plurality of access stations to which the first product is to be routed, wherein each of the access stations is positioned at one of various different locations throughout the sales floor and an exterior of the retail store, wherein each of the access stations is physically cooperated with one of the plurality of access passages of the rack system, and each of the access stations is accessible by customers for use by customers in requesting products while at the retail store, and causing the first unmanned vehicle to transport the first tote to a first access passage of the plurality of access passages that physically corresponds to the first access station, wherein each of the access passages cooperates the plurality of racks with at least one of the plurality of access stations and comprises some of the rail system enabling the unmanned vehicles to transport totes between the racks and the corresponding access stations;
receiving sensor data from one or more sensor systems of a plurality of sensor systems communicatively coupled with at least the central control circuit and configured to detect at least totes as they are moved through the rack system, and confirm a retrieval and transport of the first tote, wherein the one or more sensor systems are separate from the plurality of unmanned vehicles; and
directing the first unmanned vehicle to utilize the first access passage and transport the first tote to the first access station.

13. The method of claim 12, wherein the identifying the first tote comprises identifying the first product is stored within a first compartment of multiple different compartments of the first tote, wherein at least a first set of multiple totes of a plurality of totes comprise multiple compartments each configured to receive one product;
obtaining a mapping of the compartments of the multiple compartment first tote;
obtaining an identifier of at least one compartment and less than all of the compartments to which a requesting individual is to be granted access to the tote, including an identifier of the first compartment;
directing at least one access door of the first access station to open, wherein the access stations each comprise an access system comprising an access system controller and at least one access door movably positioned to prevent access and allow access to at least a portion of a product retrieval opening within the access station that is configured to align with a tote when placed within the access station, wherein the directing the at least one access door of the first access station to open comprises controlling the at least one access door to align with the at least one compartment in response to instructions from the central control circuit enabling the requesting individual to access and retrieve each product within the at least one compartment of the first multiple compartment tote while simultaneously preventing access to the remainder of the multiple compartments of the multiple compartment first tote.

14. The method of claim 12, wherein the identifying the first access station comprises identifying the first access station is exterior to the retail store, and directing the first unmanned vehicle to the first access passage of the plurality of access passages that links the first access station with the racks.

15. The method of claim 14, wherein the directing the first unmanned vehicle to the first access passage comprises causing the first unmanned vehicle to travel along a first length of the first access passage extending from the racks positioned above the dropdown ceiling to a subterranean passage positioned below at least a portion of the retail store, and along a second length of the first access passage extending between the first length of the first access passage along the subterranean passage to the first access station located at an exterior of the retail store.

16. The method of claim 12, further comprising:
maintaining, through a first temperature control system, a first temperature zone surrounding a first portion of the rack system positioned above the dropdown ceiling below a first temperature threshold;
maintaining a second temperature zone surrounding a second portion of the rack system positioned above the dropdown ceiling within a threshold of a second temperature which is different than the first temperature threshold, wherein the second temperature zone is separated from the first temperature zone by at least a first insulating barrier;
enabling the plurality of unmanned vehicles to move between the first temperature zone and the second temperature zone through a first movable barrier cooperated with the first insulating barrier and positioned relative to at least a first pair of rails of the plurality of pairs of rails; and
enabling the plurality of unmanned vehicles to access the first access passage of the plurality of access passages extending between the first temperature zone and the first access station positioned on the sales floor, through a second movable barrier of the first temperature zone and positioned along a length of the first access passage.

17. The method of claim 12, further comprising:
maintaining a mapping of locations on the sales floor of different products; and
directing the placement of totes to locations within the plurality of racks to be positioned above the sales floor corresponding to where that product is mapped on the sales floor.

18. The method of claim 17, positioning a set of multiple access passages of the plurality of access passages to each provide access to one of a plurality of predefined zones of the sales floor corresponding to an organization of products.

19. The method of claim 12, further comprising:
queuing a plurality of totes to receive products delivered to a loading dock at the retail store, wherein the plurality of access passages comprises a set of loading dock access passages physically located proximate the loading dock of the retail store wherein at least a return access passage is configured to enable empty totes to be queued to receive one or more products delivered to the retail store at the loading dock, and a plurality of storing access passages configured to enable multiple different unmanned vehicles to simultaneously move totes into which products delivered to the retail store are transported to the rack system;
receiving, for each tote into which a product delivered to the retail store at the loading dock is placed, an identifier of at least one product placed into a second tote;
obtaining a second storage cell identifier of a second storage cell of the plurality of storage cells into which the second tote is to be placed;
notifying a second unmanned vehicle to transport the second tote through a first storing access passage of a plurality of storing access passages and place the first tote in the second storage cell.

20. The method of claim 12, further comprising:
receiving, through a user interface of a second access station, a notification of a return product to be moved from the sales floor to the rack system;
directing a second unmanned vehicle to transport a second tote of the plurality of totes to the second access station to receive the return product;
receiving an identifier of the return product;
determining based on the identifier of the return product a second storage cell into which the second tote is to be placed while the second tote stores the return product; and
directing the second unmanned vehicle to the second storage cell.

* * * * *

UNITED STATES PATENT AND TRADEMARK OFFICE
CERTIFICATE OF CORRECTION

PATENT NO. : 10,769,587 B2  
APPLICATION NO. : 16/435735  
DATED : September 8, 2020  
INVENTOR(S) : Paul E. Durkee et al.

Page 1 of 1

It is certified that error appears in the above-identified patent and that said Letters Patent is hereby corrected as shown below:

In the Claims

At Column 24, Line 11, in Claim 2, insert --to-- after "allow access".

At Column 24, Line 20, Claim 2, insert --first multiple compartment-- after "to the" and before "tote".

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*